United States Patent
Tobias

(10) Patent No.: US 10,947,018 B2
(45) Date of Patent: Mar. 16, 2021

(54) CUPS AND CONTAINERS WITH A LIVING HINGE AND SLEEVES

(71) Applicant: Clarity, Inc., Los Angeles, CA (US)

(72) Inventor: Glenn Tobias, Los Angeles, CA (US)

(73) Assignee: CLARITY, INC., Los Angeles, CA (US)

( * ) Notice: Subject to any disclaimer, the term of this patent is extended or adjusted under 35 U.S.C. 154(b) by 0 days.

(21) Appl. No.: 16/001,785

(22) Filed: Jun. 6, 2018

(65) Prior Publication Data

US 2019/0375560 A1     Dec. 12, 2019

(51) Int. Cl.
| | | |
|---|---|---|
| B65D 43/16 | (2006.01) | |
| B65D 21/02 | (2006.01) | |
| B65D 1/26 | (2006.01) | |

(52) U.S. Cl.
CPC ........... *B65D 43/162* (2013.01); *B65D 1/265* (2013.01); *B65D 21/0233* (2013.01); *B65D 2543/00046* (2013.01); *B65D 2543/00092* (2013.01); *B65D 2543/00101* (2013.01); *B65D 2543/00296* (2013.01); *B65D 2543/00351* (2013.01); *B65D 2543/00842* (2013.01)

(58) Field of Classification Search
CPC .. B65D 43/162; B65D 1/265; B65D 21/0233; B65D 2543/00046; B65D 2543/00092; B65D 2543/00101; B65D 2543/296; B65D 2543/00351; B65D 2543/00842
USPC .................................. 220/839, 4.23
See application file for complete search history.

(56) References Cited

U.S. PATENT DOCUMENTS

| | | | | |
|---|---|---|---|---|
| 1,203,195 | A | * | 10/1916 | Hanshue ................. B65D 5/02 229/126 |
| 3,137,431 | A | | 6/1964 | Crouse |
| 3,373,896 | A | | 3/1968 | Davis |
| 3,655,111 | A | * | 4/1972 | Surerus ................. B65D 1/265 206/515 |
| 3,674,512 | A | | 7/1972 | Andros |
| 3,696,987 | A | | 10/1972 | Schuff et al. |
| D229,081 | S | | 11/1973 | Martinelli |
| 3,820,684 | A | | 6/1974 | Harrison |

(Continued)

FOREIGN PATENT DOCUMENTS

| | | |
|---|---|---|
| CA | 1249232 | 1/1989 |
| EP | 2762418 | 8/2014 |

(Continued)

*Primary Examiner* — J. Gregory Pickett
*Assistant Examiner* — Niki M Eloshway
(74) *Attorney, Agent, or Firm* — Cislo & Thomas, LLP

(57) ABSTRACT

The present invention is directed to cups, containers, and sleeves therefore having a living hinge and a dual seal structure on the lid such that the seal created by the contact of the lid with the inside of the cup or container ensures a secure, friction fit orientation to prevent spillage or leakage of the contents therein. The dual seal is created by a first component on the lip of the lid that extends down from the top of the lid and is substantial in shape with a rib on the bottom edge of the lip and the circumference of the lip that is of the same size and shape as the inner circumference of the cup or container such that a secure seal is created when closed. The cups and containers also have an inner concentric structure that follows the shape of the cup or container just above the base to offer stabilization, and ease of stacking, removal, and manufacture.

16 Claims, 37 Drawing Sheets

(56) References Cited

U.S. PATENT DOCUMENTS

| | | |
|---|---|---|
| 4,076,123 A | 2/1978 | Davis |
| 4,257,526 A | 3/1981 | Weits et al. |
| 4,589,569 A | 5/1986 | Clements |
| 4,640,435 A | 2/1987 | Dutt |
| 5,270,011 A | 12/1993 | Altherr |
| 5,312,011 A | 5/1994 | Fischer |
| D359,882 S | 7/1995 | Birge, Jr. |
| D373,927 S | 9/1996 | Kramer et al. |
| 5,820,016 A | 10/1998 | Stropkay |
| 5,897,019 A | 4/1999 | Stropkay |
| D438,298 S | 2/2001 | McNutt |
| 6,422,024 B1 | 7/2002 | Foye |
| 6,955,289 B2 | 10/2005 | Green |
| D543,777 S | 6/2007 | Scum et al. |
| D553,441 S | 10/2007 | Mirpuri |
| D590,662 S | 4/2009 | Cheng |
| D591,595 S | 5/2009 | Tedford, Jr. |
| D592,056 S | 5/2009 | Tedford, Jr. |
| D610,875 S | 3/2010 | Wingfield et al. |
| D621,659 S | 8/2010 | Liu |
| D642,862 S | 8/2011 | Tobias |
| D642,863 S | 8/2011 | Tobias |
| D642,864 S | 8/2011 | Tobias |
| 8,100,289 B1 | 1/2012 | Tobias |
| D664,001 S | 7/2012 | Liu |
| D672,610 S | 12/2012 | Park et al. |
| 8,336,732 B1 | 12/2012 | Tobias |
| D673,421 S | 1/2013 | Chiu et al. |
| 8,360,262 B2 * | 1/2013 | Vovan ............... B65D 43/162 220/266 |
| D683,186 S | 5/2013 | Tobias |
| D699,595 S | 2/2014 | Farrow et al. |
| 8,684,223 B1 | 4/2014 | Kalamaras |
| 8,701,887 B2 | 4/2014 | Baker et al. |
| 8,701,914 B1 | 4/2014 | Buck |
| 8,870,010 B2 * | 10/2014 | Buck ............... A47G 19/2205 220/23.83 |
| D717,170 S | 11/2014 | Tan |
| D722,823 S | 2/2015 | Del Mar Menendez |
| 9,114,917 B1 | 8/2015 | Salem |
| D749,363 S | 2/2016 | Tacker et al. |
| D755,013 S | 5/2016 | Khubani et al. |
| D763,039 S | 6/2016 | Ionov |
| 9,359,113 B2 * | 6/2016 | Chen ............... B65D 43/162 |
| D763,620 S | 8/2016 | Szymanski |
| D763,621 S | 8/2016 | Szymanski |
| D773,895 S | 12/2016 | Dai |
| D773,896 S | 12/2016 | Dai |
| D784,081 S | 4/2017 | Szymanski |
| D784,082 S | 4/2017 | Yao |
| D789,743 S | 6/2017 | Washburn et al. |
| D794,390 S | 8/2017 | Boettcher Sebben |
| D795,643 S | 8/2017 | Barlow |
| D815,489 S | 4/2018 | Yan et al. |
| D815,906 S | 4/2018 | Yee et al. |
| 9,950,845 B2 * | 4/2018 | Hsieh ............... B65D 43/14 |
| D820,480 S | 6/2018 | Kaliroff |
| D823,687 S | 7/2018 | Kelly |
| D851,994 S | 6/2019 | Brady et al. |
| 2003/0052018 A1 | 3/2003 | Wilson |
| 2004/0178207 A1 | 9/2004 | Kirn |
| 2005/0189361 A1 * | 9/2005 | Bresler ............... B65D 1/265 220/703 |
| 2006/0289549 A1 * | 12/2006 | Vovan ............... B65D 43/021 220/791 |
| 2007/0169506 A1 | 7/2007 | Heuschober |
| 2007/0228134 A1 | 10/2007 | Cook et al. |
| 2008/0006643 A1 | 1/2008 | Ma |
| 2011/0068114 A1 * | 3/2011 | Colby ............... B65D 81/3876 220/737 |
| 2011/0180552 A1 * | 7/2011 | Sarson ............... B65D 3/04 220/592.16 |
| 2011/0303678 A1 | 12/2011 | Zomorodi et al. |
| 2011/0309093 A1 | 12/2011 | Buck |
| 2012/0024877 A1 | 2/2012 | Tobias |
| 2012/0125931 A1 | 5/2012 | Roth et al. |
| 2012/0174795 A1 | 7/2012 | Uspenski et al. |
| 2013/0119065 A1 * | 5/2013 | Buck ............... B65D 51/28 220/523 |
| 2014/0231445 A1 * | 8/2014 | Possell ............... B65D 43/169 220/810 |
| 2014/0367296 A1 * | 12/2014 | Berger ............... A47K 10/421 206/494 |
| 2015/0014333 A1 | 1/2015 | Greer |
| 2015/0225146 A1 | 8/2015 | Paz Luis |
| 2016/0083151 A1 | 3/2016 | Stahlecker |
| 2017/0096281 A1 | 4/2017 | Tiesberger et al. |
| 2017/0362001 A1 * | 12/2017 | Buck ............... A47G 19/2272 |

FOREIGN PATENT DOCUMENTS

| | | |
|---|---|---|
| JP | 2000043915 | 2/2000 |
| JP | 2010517882 | 5/2010 |
| JP | 1436977 | 3/2012 |
| WO | 2013034289 | 3/2013 |

* cited by examiner

CUPS AND CONTAINERS WITH A LIVING HINGE AND SLEEVES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

This patent application is related to U.S. Design Patent Application No. 29/721,976 filed on Jan. 24, 2020 entitled "Cup With A Lid"; U.S. Design Patent Application No. 29/722,025 filed on Jan. 24, 2020 entitled "Container With a Lid"; U.S. Design Patent Application No. 29/722,104 filed Jan. 27, 2020 entitled, "Living Hinge on a Cup or Container"; U.S. Patent Application No. 29/722,119 filed Jan. 27, 2020 entitled, "Cup or Container Having an Exterior Thermal Ribbing and U.S. Patent Application No. 29/721,999 filed on Jan. 24, 2020 entitled "Cup or Container With a Lid", all of which are divisional applications of U.S. Design Pat. No. D813,613 issued on Jan. 28, 2020 from an application filed on Jun. 7, 2018 entitled, "Cup With A Lid"; and is also related to U.S. Design Pat. No. D885,838 issued on Jun. 20, 2020 based upon Patent Application No. 29/650,521 filed on Jul. 9, 2019 entitled "A Cup With a Living Hinge and An Attached Lid Having An Outer Lip." Each of those applications is incorporated here by this reference.

TECHNICAL FIELD

This invention relates to one-piece, easily recyclable, sealable, non-leaking cups and containers for holding hot or cold liquid or food with a receptacle portion and a lid attached to the receptacle with a living hinge. The cups and containers for hot liquid and food may include built-in insulation ribs or an injection molded sleeve for sliding over the cups to insulate or protect a user's hand from the heat of the liquid in the cup. The cups and containers are preferably made of a recyclable resin or polypropylene and are manufactured in a quick and efficient manner.

BACKGROUND ART

There are a number of prior art references in this field, including U.S. Pat. Nos. 3,373,896; 4,076,123; 4,257,526; 4,640,435; 5,270,011; 5,312,011; 5,820,016; 6,955,289; 8,100,289; 8,336,732; 8,701,887; 8,701,914; D642,863; D642,862; D642,864; D683,186; and U.S. Published Application Nos. 2017/0096281 and 2012/0024877.

Each of these patents or published applications has one or more deficiencies such as collapsing when full, complicated for a user or complicated to manufacture, multi-stream recycling requirements, leaking, slow and inefficient manufacturing processes, expensive manufacturing processes, or bulky and not portable in large quantities. These shortcomings necessitate the need for one-piece, recyclable, sealable, non-leaking cups and containers for holding hot or cold liquid or food with a receptacle portion and a lid attached to the receptacle with a living hinge, a dual seal, and a fluid diverter as described in this invention, and an injection molded sleeve for sliding over the cup or container or built-in insulation ribbing.

DISCLOSURE OF INVENTION

The present invention is a substantial improvement in utility and functionality from standard cup and lid combinations and overcomes the deficiencies in the art by achieving one-piece, totally recyclable, sealable, non-leaking cups and containers for holding hot or cold liquid or food with a receptacle portion and a lid attached to the receptacle with a living hinge. The inventive cups and containers for holding hot liquid may have a built-in sleeve with a raised surface that insulates the cup but does not interfere with stacking or the efficient manufacturing process. The build-in sleeve may be in the form of a film or repeating vertical ribs that raise up from the outer surface of the cups or containers. Also contemplated is an injection molded sleeve that fits over the receptacle portion of the cup for insulating the contents or protecting a user's hands from the heat of the material inside the cup.

The cups and containers are made by injection molding in an efficient manner using molds that can manufacture approximately 20 cups every 8 seconds. The material used for the inventive cups and containers, the claimed shapes and features of the cups and containers, the material of the mold, and the properties of the molding machine have all been taken into account in designing the embodiments disclosed and claimed herein as each unique feature has been carefully designed to facilitate the injection molding process. Because of the unique features, the process is efficient, high output, and provides a minimal impact on the injection molding machine to ensure longevity of the mold resulting in a highly economical manufacturing process that produces virtually leak free sealing cups and containers that are easily stacked, shipped, stored, and used.

Here, the injection molding operation creates all three parts, lid, hinge, and lower receptacle portion at one time as a single piece. The manufacturing components are controlled electronically resulting in an efficient manner of production and a decrease in the amount of spillage from the cups or containers, if any, by creating accurate measurements and output of the upper, inner dual seal in the receptacle portion, in the living hinge, on the edge of the lid, and on the contouring of the top of the lid. The manufacturing of the inventive cups, containers, and sleeves undercuts the cost of manufacturing paper cups, containers, and sleeves significantly. Further, the inventive design of the hinge is structured such that the mold used to make the cups and containers does not wear out. Specifically, the hinge radius is designed for mold flexibility and ejection requiring less ejection pressure.

Also, the design of the inventive cups, containers, and sleeves has been carefully honed to the presently claimed invention such that manufacturing time per unit is significantly reduced to less than 10 seconds per cup, container, or sleeve. This makes the inventive products commercially feasible and competitive pricewise with existing processes of paper cups with a poly lining or polystyrene foam cups, which are highly polluting to the environment as nearly 600 billion foam and paper cups enter the waste stream annually according to the International Coffee Organization. To date, prior art foam and paper cups frequently end up in the landfill or in the ocean as plastic pollution.

In particular, the inventive designs put less pressure on the costly manufacturing molds providing longevity of approximately 15-20 years of use on the same machine, and allow for quick compression and turn-around time. This results in increased savings as molds may cost over hundreds of thousands of dollars and more per machine.

By contrast, the prior art molded cups with a lid attached had a manufacturing time of over a minute per cup, container, or sleeve and did not function as well as the inventive designs. For example, the prior art designs of a cup with a built in lid were unstable, easily fell over or collapsed when liquid was inside, the seal created between the lid and the lower receptacle leaked and did not stabilize the structure because of the lack of a dual seal or fluid diverting structure, and it was difficult to commercially manufacture them. These inefficient designs caused increase friction on the molds causing the molds to wear out quickly, for example, after 5 years of use, thereby further decreasing the profitability of the designs.

Accordingly, the inventive embodiments disclosed provide a substantial improvement over prior patents of a cup with a built in lid as to function, leak proofing seal, and commercial manufacturing feasibility.

The inventive cup is molded and totally sealable and capable of holding liquid or food without leaking. The cup comprises a lower, receptacle portion having a base, an open top, and side walls in between the base and the open top, the base having a smaller diameter than the top, the side walls forming a cylinder from the base to the open top and creating an inner and outer portion of the cup, the open top having an upper edge defining the outermost circumference of the open top and a living hinge with a flexible radius and an indentation that runs the full circumference of the inner portion of the cup below the upper edge; the living hinge molded in the upper edge of the open top attached to the lower receptacle portion and a lid, the living hinge allowing the lid to flex over the open top wherein the lid securably fits into the indentation that runs the full circumference of the inner portion of the cup; the lid having a top surface and a bottom surface of a size and shape to securably fit into the inner circumference of the open top of the cup, the top surface of the lid being sloped downward from the outermost circumference of the open top to the center of the lid, the circumference around the bottom surface of the lid having a lip extending down from the circumference of the lid, the lip creating a dual seal structure having a bottom edge that fits in the indentation that runs the full circumference of the inner portion of the cup and a top edge that is the same size and shape as the inner circumference of the upper edge of the top, the top edge having one or more l-shaped tabs extending from the top edge up and over the upper edge of the cup; wherein the living hinge permits the lid to bend along a line of the hinge to flexibly secure the lid to the cup and prevent leakage of the material held therein.

The internal bi-directional sealing surfaces on the lip of the lid extending down from the circumference of the lid exhibit a radius male/female horizontal seal combined with a flat vertical seal of some length that is injection molded and which can be adapted to all other forms of molding including vacuum or thermal-forming via dual "skirting" features. Accordingly, the structure provides for a secure seal to virtually prevent all fluid leakage when the lid is locked properly within the indentation running the circumference of the inner portion of the cup. Also, the fluid diverter on the top of the lid ensures that all fluids run away from the seal and towards the top center of the lid. This prevents puddling at the lid-wall intersection. The fluid diverter is positioned throughout the entire top circumference of the lid, including on the living hinge to ensure the most effective seal and flow of liquids away from the edge. This helps when opening the cups too to prevent liquid from dripping on the user unnecessarily. The bi-directional seal is included in all cups and containers.

In some embodiments, the lid has a small opening opposite the living hinge to allow liquid to pass through. An individual drinking from the cup could sip liquid through the small opening. In addition, in some embodiments with this small drinking hole opening, the lid has a breathe hole approximately 1-2 mm in diameter next to the living hinge to allow for the smooth flow of liquid from the cup and eliminate the suction that would keep the liquid from coming out of the drinking hole. Alternatively, the lid has a circular opening in the center capable of receiving a straw. Also, the cups can be easily stacked because of the inner concentric circular material on the inside of the cup just above the base. This inner portion of the cup above the base has a concentrically molded lip extending the circumference of the inner portion of the cup on the sidewall just above the base. This concentrically molded lip allows cups to be stacked together and easily removed because the base of each cup maintains a distance from a second cup and does not cause the cups to stick together.

The living hinge of the cup is thin and flexible with a flexible radius, having the same thickness as the rest of the cup and made from the same material as the lower portion of the cup and the lid, the flexible radius allowing for the lid to bend along the line of the hinge and securely fit within the top inside of the cup. The flexible radius is positioned in a break in the top circumference of the cup, the break in the circumference having two arcuate edges on either side of the living hinge extending from the flexible radius of the living hinge up to the upper edge.

The arcuate edges ensure that there is no wear and tear on the living hinge, provide minimal friction, and allow for a smooth opening and closing movement. The top of the living hinge on the top of the lid of the cup is also curved, maintaining the same curve as the inner circumference of the cup. The curved shape of this portion of the hinge ensures that any additional liquid material on the top of the lid is directed downward and away from the seal. Furthermore, the overall shape of the living hinge and the arcuate edges in the break in the circumference ensure a secure seal between the lid and the bottom portion of the cup. In addition, the shape allows efficient molding and removal of the cup from the mold in the manufacture of the cup such that the molds are not worn unnecessarily and manufacturing can be done quickly and faster than prior molding processes.

The inventive containers may be round in shape similar to the cups or may be rectangular or square to accommodate food articles. All of the containers have the same living hinge and are made of the same material as the cups. They are molded and totally sealable and capable of holding liquid or food without leaking. The containers comprises a lower, receptacle portion having a base, an open top, and side walls in between the base and the open top, the base being round, substantially rectangular or square, and having a smaller area at the bottom than the top, the side walls forming a cylinder if the container base is round, or side walls in a rectangular or square shape if the base is rectangular or square, respectively, all side walls emanating from the base to the open top and creating an inner and outer portion of the container, the open top having an upper edge defining the outermost circumference of the open top and a living hinge with a flexible radius and an indentation that runs the full circumference of the inner portion of the container below the upper edge; the living hinge molded in the upper edge of the open top attached to the lower receptacle portion and a lid, the living hinge allowing the lid to flex over the open top wherein the lid securably fits into the indentation that runs the full circumference of the inner portion of the container; the lid having a top surface and a bottom surface of a size and shape to securely fit into the inner circumference of the open top of the container, the top surface of the lid being sloped downward from the outermost circumference of the open top to the center of the lid, the circumference around the bottom surface of the lid having a lip extending down from the circumference of the lid, the lip creating a dual seal structure having a bottom edge that fits in the indentation that runs the full circumference of the inner portion of the container and a top edge that is the same size and shape as the inner circumference of the upper edge of the top, the top edge having one or more l-shaped tabs extending from the top edge up and over the upper edge of the cup; wherein the living hinge permits the lid to bend along a line of the hinge to flexibly secure the lid to the container and prevent leakage of the material held therein.

The containers may have an opening in the lid to let steam escape or to pour liquid out.

The inventive sleeves are open on the inside, round in shape, and the inner diameter of the sleeve is wider at the top than at the bottom so as to create a snug fit over the lower receptacle portion of the inventive cups upon application. They are rigid and collapsible with living hinges on either side of the sleeve. They do not have overlapping sides such that the thickness is consistent throughout. The sleeve is created by an injection molded manufacturing process out of the same resin as the inventive cups and containers. It may vary in width size in order to accommodate cups of different sizes, e.g., cups capable of holding approximately 2 to 40 ounces, although the width may be constant and of a size and shape that could accommodate cups of all sizes capable of holding approximately 2 to 40 ounces of liquid. For example the diameter of the sleeves may be between 2 and 8 cm, preferably between 3 and 6 cm.

The length of the inventive sleeves is adapted to provide enough coverage over a cup so that a user holding the cup or container would be protected from a cup or container holding hot liquids or foods. For example, the length of the sleeves may be between 2 to 8 cm, preferably between 2 to 5 cm.

The material used to manufacture the cups, containers, and sleeves is preferably a resin, polypropylene, or other similar recyclable and moldable material. Alternative materials may include a bioresin that is biodegradable and compostable creating a similar, singular stream of recycling as the use of the resin polypropylene. Because the inventive embodiments use a single material for the cup, lid, sleeve, and label, they are totally recyclable and can be reground into a usable resin straight from a recycling bin.

Further, an advantage of the cups and containers being the same material as the sleeves is that the inventive items create a single stream of recycling because there are no separation requirements. The cup, lid, sleeve, and any printed labels on the cups or containers are made of the same single resin or bioresin and are truly recyclable or degradable.

By contrast, existing prior art cups and lids are comprised of layers of one or more materials or are a combination of paper and plastic that complicate the recycling process. In order to recycle cups and containers that are comprised of layers, they must be stripped into their component parts in order to recycle them. For example, Tetra™ packs that hold many food and liquid items are lined with a material that must be stripped from the outer material before recycling. Paper cups used at coffee shops with a high volume of consumers are coated with a thin plastic lining to prevent leaks. These are more challenging to recycle because the plastic isn't easy to separate from the paper. Currently, there are very few cities that have the proper infrastructure in place to process such "layered" or lined cups and containers. While New York, Seattle, and Washington D.C. are three of the cities that can tackle this complex process, cities without this capability end up putting the prior art cups and containers in a landfill. Also, it is much less expensive for large coffee shops to send their lined paper cup waste and plastic lids to a landfill than to locate outlets to process the cups in order to compost and recycle them.

Further, paper cups and containers contaminated with grease or food residue, which commonly occurs when containers hold food or when cups or containers are placed in a recycling bin with other greasy materials, cannot be recycled at all. In sum, recyclable and compostable packaging is only beneficial if it ends up at a waste facility that can process it. Many compostable cups will not breakdown in a backyard composter because they do not get hot enough, or even in a landfill where waste decomposes through an anaerobic process producing methane, a greenhouse gas. And, compostable cups can be contaminants at a recycling facility.

Here, the inventive cups, containers, sleeves, and label are made in the same resin and can be discarded without the need for the separation by the user or processor. This resolves the conflicts and confusion in the recycling industry where single-stream bins now include paper bonded with polyactic acid linings that can only be removed or separated in the few cities with the expensive infrastructure to do so. These along with the mixed plastic resin cups that contaminate recycling grounds if not separated are among the vast majority of the 600 billion paper and plastic cups produced annually that end up in landfills every year.

More stringent measures to reduce this waste are in the works as many cities and municipalities are considering a tax on single use prior art paper cups or banning them outright. The inventive cups, containers, sleeves, and labels resolve this problem in the art as they are multiple use, reusable, and totally recyclable or biodegradable.

An alternative method of production of the cups, containers, and sleeves may include 3-D printing, thermoforming, or vacuum thermoforming.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
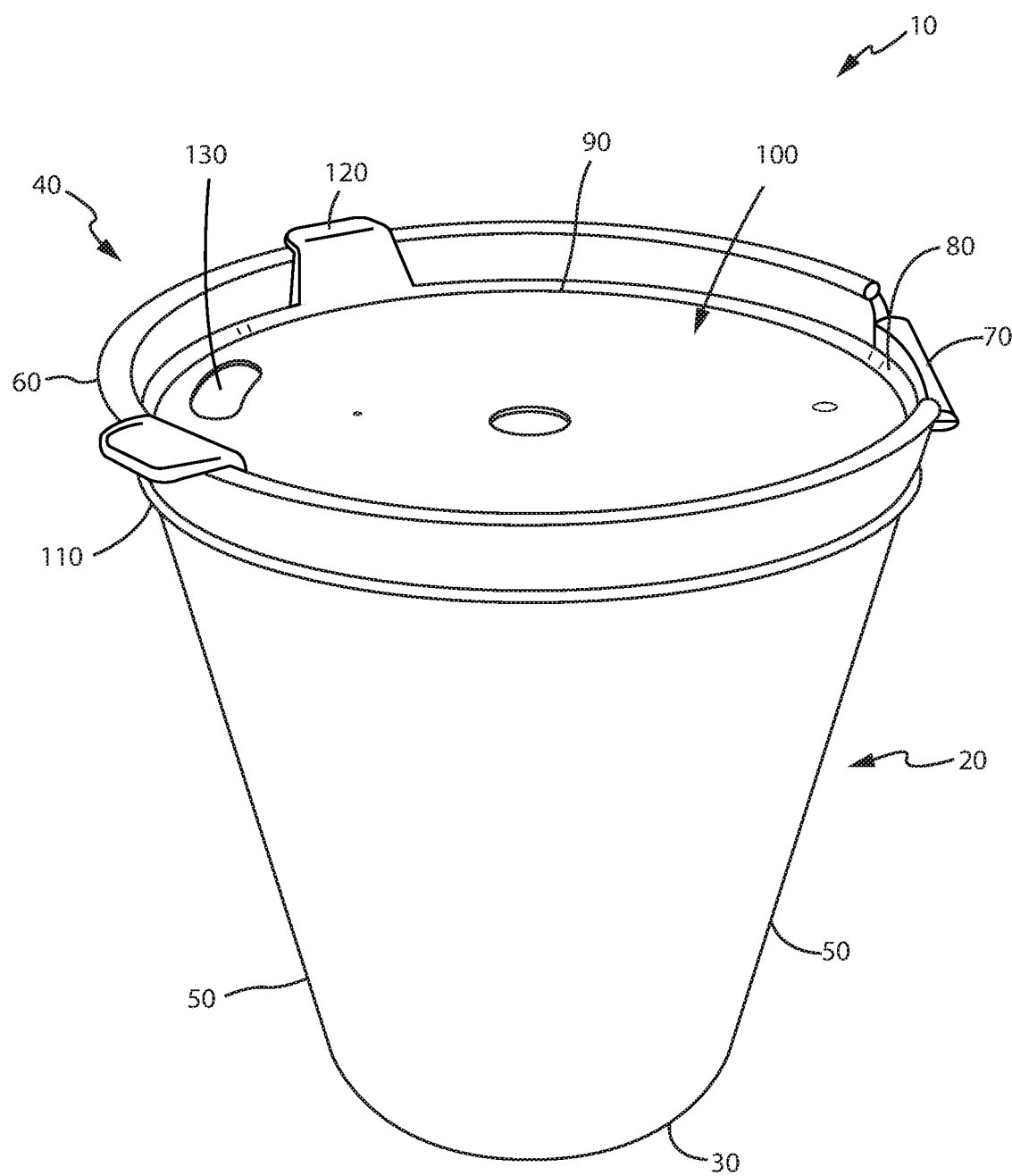
FIG. 1 is a perspective view of a cup with a living hinge and a lid having an inner dual seal with an indented lid.

FIG. 1 is a perspective view of a cup with a living hinge and a lid having an inner dual seal with an indented lid. The molded, sealable cup for holding liquid or food comprising 10 has a lower, receptacle portion 20 having a base 30, an open top 40, and side walls 50 in between the base and the open top, the base having a smaller diameter than the top, the side walls forming a cylinder from the base to the open top and creating an inner and outer portion of the cup, the open top having an upper edge 60 defining the outermost circumference of the open top and a living hinge 70 with a flexible radius 80 and an indentation 90 that runs the full circumference of the inner portion of the cup below the upper edge. The living hinge 70 is molded in the upper edge of the open top 60 attached to the lower receptacle portion 20 and a lid 100, the living hinge 70 allowing the lid 100 to flex over the open top wherein the lid 100 securably fits into the indentation 108 that runs the full circumference of the inner portion of the cup. The lid structure 100 has a top surface 102 and a bottom surface 104 of a size and shape to securably fit into the inner circumference of the open top of the cup 108, the top surface of the lid being sloped downward from the outermost circumference of the open top to the center of the lid 90, the circumference around the bottom surface of the lid having a lip extending down from the circumference of the lid 106, the lip 106 creating a dual seal structure having a bottom edge 106 that fits in the indentation that runs the full circumference of the inner portion of the cup 108 and a top edge that is the same size and shape as the inner circumference of the upper edge of the top, the top edge having one or more l-shaped tabs 120 extending from the top edge up and over the upper edge of the cup 10. The living hinge 70 of the present invention permits the lid 100 to bend along a line of the hinge to flexibly secure the lid 100 to the lower portion of the cup 20 and prevent leakage of the material held therein.

In addition, the indentation that runs the full circumference of the inner portion of the lid below the upper edge 90 directs fluid away from the seal and into the center of the lid. and wherein the dual seal ensures that the outer circumference of the lid contacts the inner circumference of the cup to ensure a secure seal. These internal bi-directional sealing surfaces exhibit a radius male/female horizontal seal combined with a flat vertical seal of some length that is injection molded and which can be adapted to all other forms of molding including vacuum or thermal-forming via dual "skirting" features. Also, the inner molded 360 degree stacking feature can be located on the inner side of the circumference of the sidewall of the cup 132. The stacking feature 132 can add weight to the cup and improve anti-tipping stability of the product because it causes the inner circumference of the cup just above the base to be a bit thicker than the side walls of the cup. An alternative design of the stacking feature can be raised concentric circles be located at the bottom most inside base of the cup.

Also, the fluid diverter 90 on the top of the lid ensures that all fluids run away from the seal and towards the top center of the lid. This prevents puddling at the lid-wall intersection. This fluid diverter 90 is positioned around the entire circumference of the top of the lid, including the living hinge 70 area. The living hinge 70 is designed for mold flexibility and ejection requiring less ejection pressure.

Figure 33:
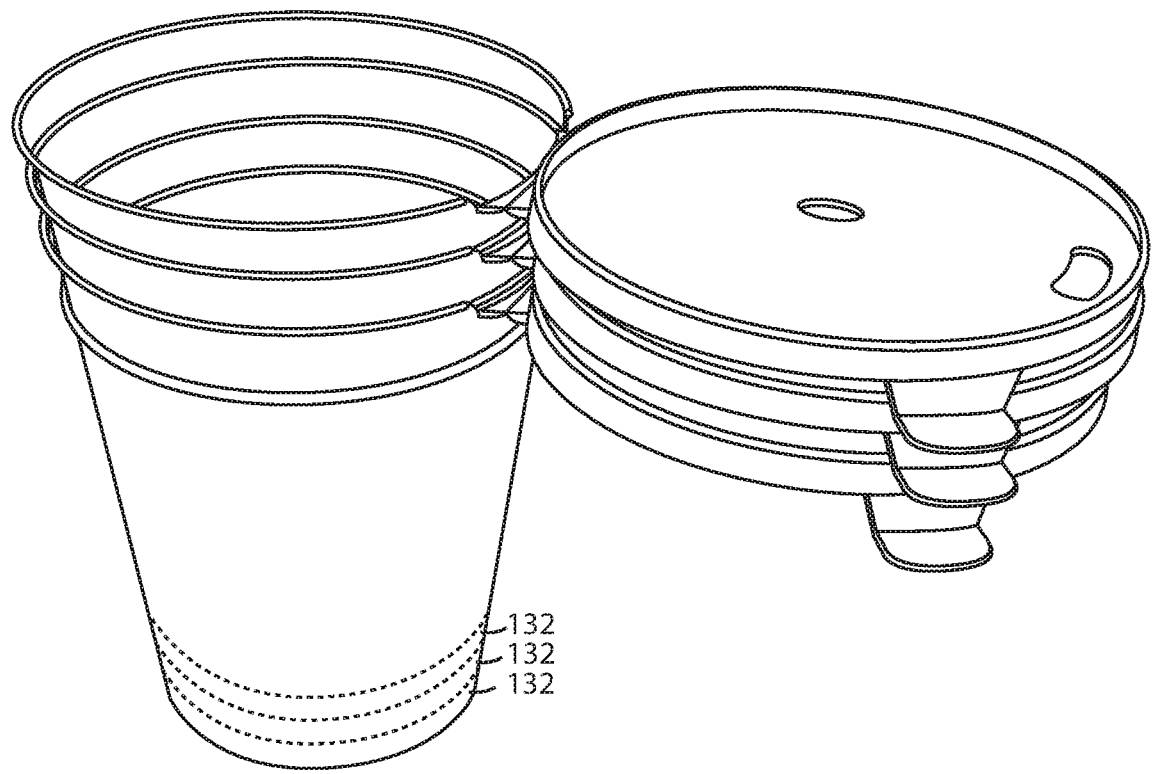
FIG. 33 is a perspective view of the inventive cups with a living hinge and an inner dual seal stacked with the lid in the open position

The lid may have a small opening 130 opposite the living hinge to allow liquid to pass through and a small breathe hole adjacent to the living hinge to allow for the smooth flow of the liquid though the small opening when one is drinking. The small breathe hold prevents the suction of the liquid created when trying to drink the fluid out of the cup. Also, the base of the inner portion of the cup has a concentrically molded lip 132 extending the circumference of the inner portion of the cup on the sidewall just above the base wherein the concentrically molded lip 132 allows cups to be stacked together and easily removed. In stacking the cups, the base of a second cup sits on top of the concentrically molded lip 132 of a first cup and the living hinges and lids line up. Multiple cups can be stacked upon one another and easily separated as shown in FIG. 33. Disposable cups in the prior art may not have this feature resulting in cups sticking together when stacked and requiring complicated dexterity from a user to separate the cups. By contrast, the inventive cups may be selected from a stack by a user and easily separated without sticking due to the concentrically molded lip 132 allowing flight attendants, coffee shop and restaurant industry servers to quickly access a cup and assist a client.

In addition, the upper edge of the cup 60 has a break in the circumference to accommodate the living hinge 70, the break in the circumference having two arcuate edges 72 on either side of the living hinge extending from the flexible radius 80 of the living hinge 70 up to the upper edge 60.

The cup shown in FIG. 1, along with all other embodiments of cups and containers disclosed herein may have a built-in insulation sleeve comprised of vertical concentric ribs that rise above the surface of the lower receptacle portion and insulate the cup or container, but do not interfere with stacking or manufacturing. The raised ribs are made of the same material as the cup.

The cup shown in FIG. 1, along with all other embodiments of cups and containers disclosed herein may have a label wrapping around the outside of the cup or container made of the same material as the cup or container so nothing has to be peeled off or changed prior to placing the inventive cup or container into the recycling stream. The labels may be clear, colored, white and have a smooth texture or an "orange peel" slightly rough texture. Product names, pictures, and text may be added to the labels. Also, the labels can be added during the injection molding process so that manufacturing is not complicated by the addition of the label.

Figure 2:
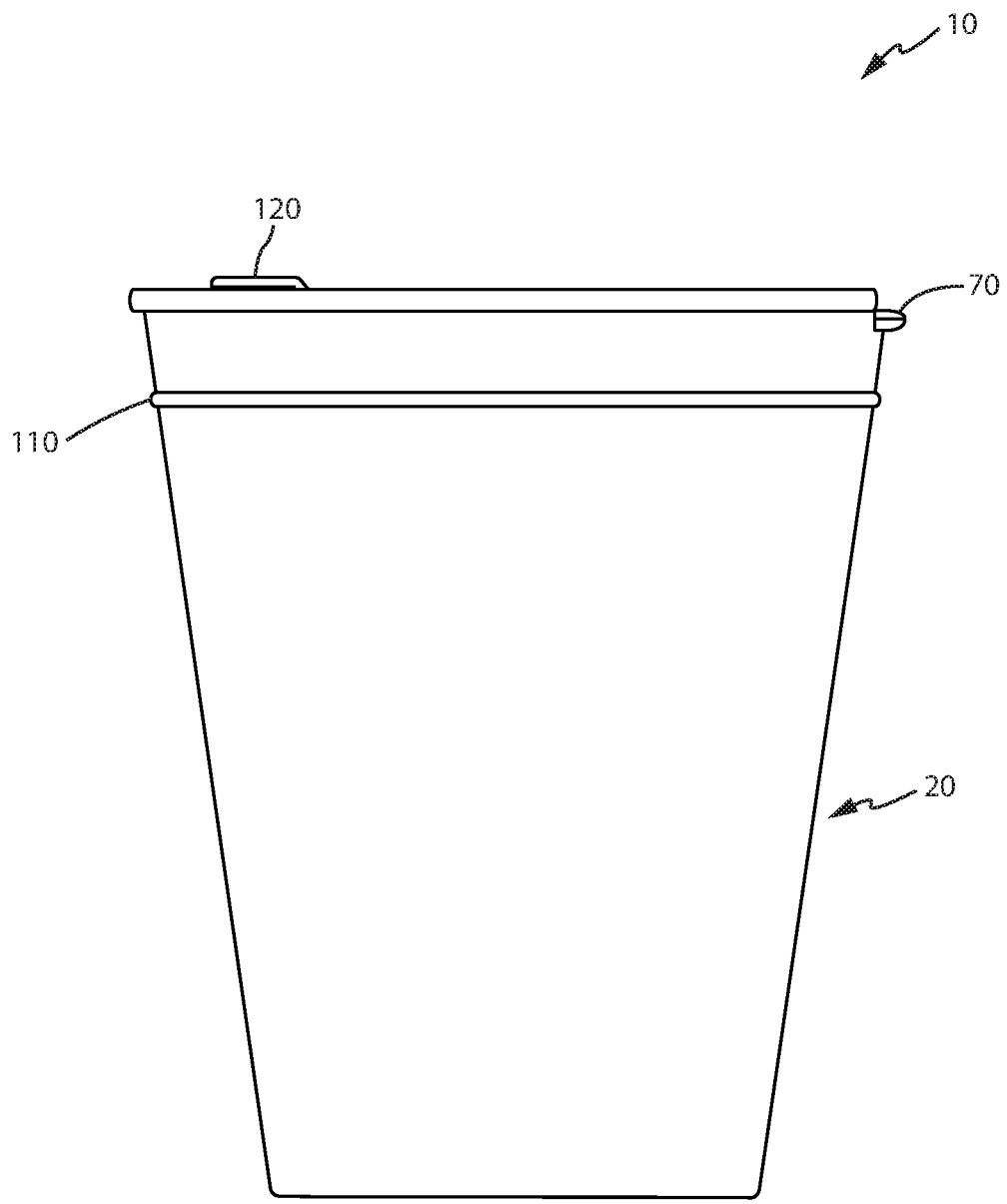
FIG. 2 is a right side view thereof.

FIG. 2 is a right side view of the cup 10 with a living hinge 70 and a lid having an inner dual seal when the lid is friction fit into the lower portion of the cup 20, and fit within the inner indentation running the circumference of the inner portion of the cup, the outer rib is shown 110. The first component of the dual seal is the fit within the indentation and the second component of the dual seal is the friction fit of the upper edge of the bottom portion of the lit pushed into the interior of the cup. The lid can be easily removed and inserted using one or more tabs 120.

Figure 3:
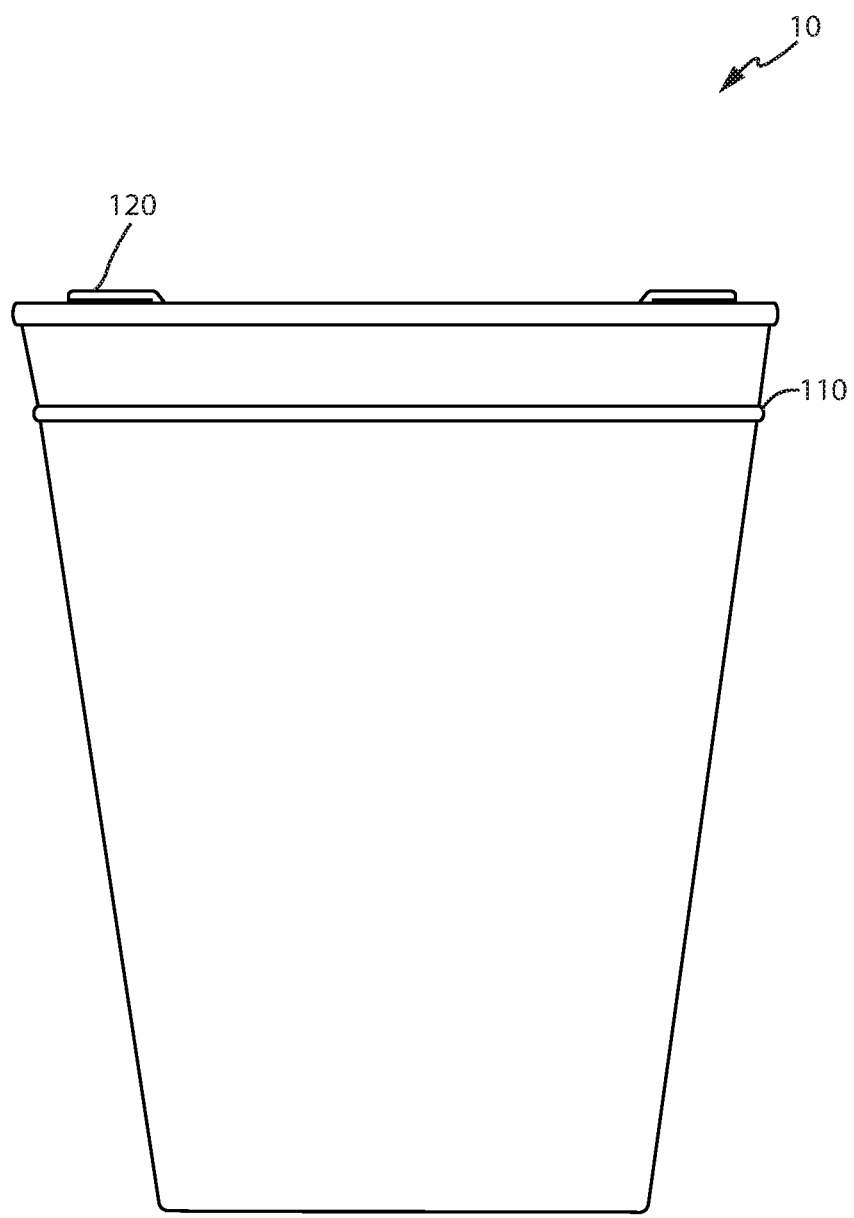
FIG. 3 is a front view thereof.

FIG. 3 is a front view of the cup 10 with the lid in the closed position showing one or more tabs 120. Also, the outer exterior rib 110 of the inner dual seal when the lid is friction fit into the lower portion of the cup 20 is shown.

Figure 4:
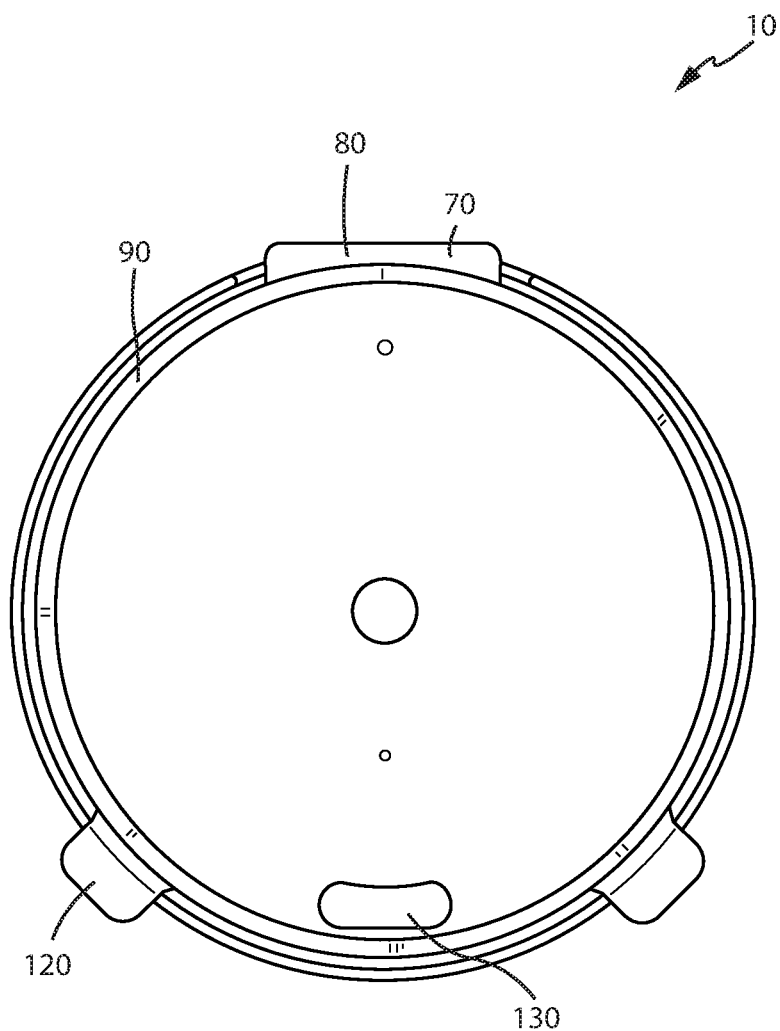
FIG. 4 is a top view thereof.

FIG. 4 is a top view of the cup 10 with a living hinge 70 and the flexible radius 80 showing the lid in the friction fit position The fluid diverter structure 90 is shown and as noted herein is higher where the edge of the lid meets the inside of the cup and angled down in the direction of the center of the lid in order to divert fluid away from the seal. One or more tabs 120 to assist opening and closing the lid are shown along with a small opening 130 through which liquid inside the cup may pass or a straw may be inserted.

Figure 5:
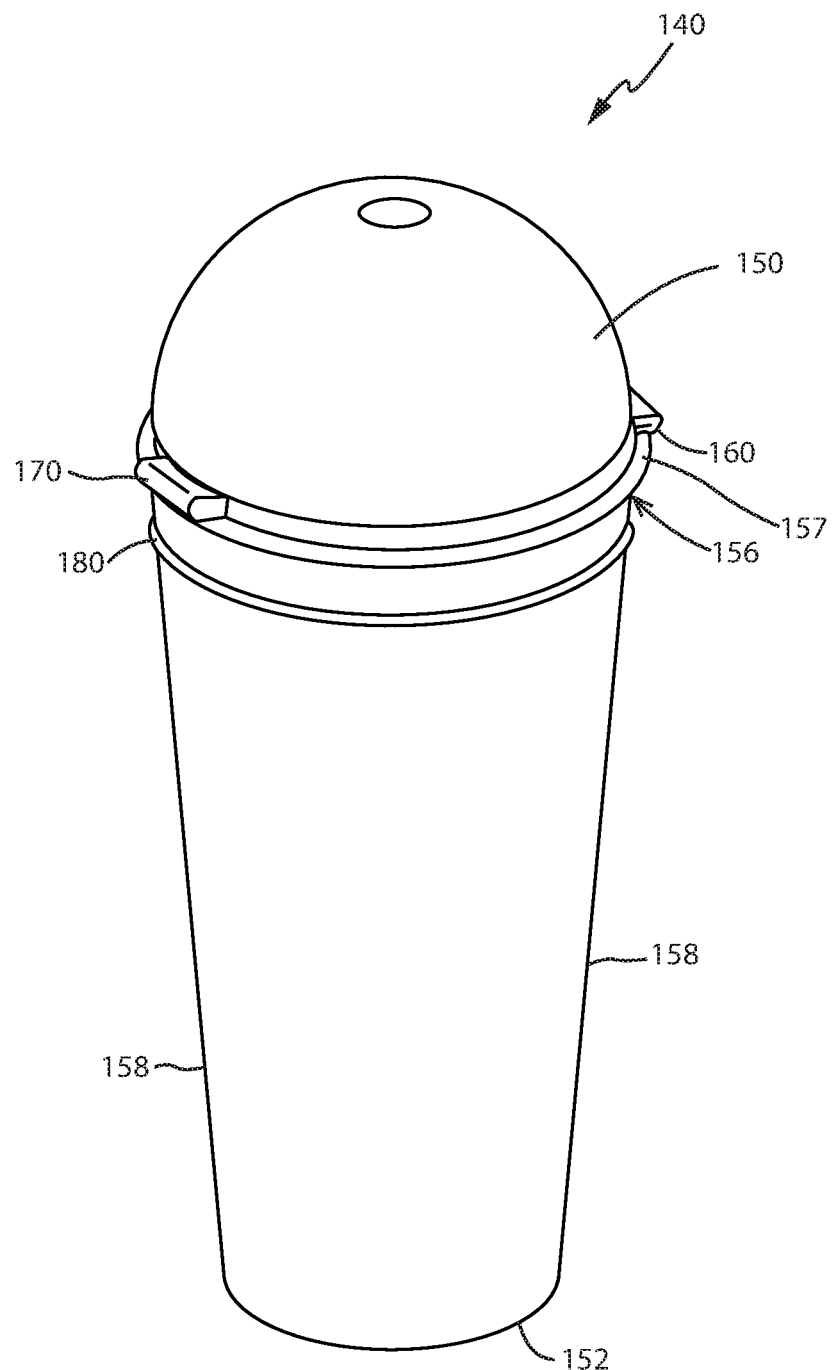
FIG. 5 is a perspective view of a cup with a living hinge and a lid having an inner dual seal with a bubble shaped lid.
Figure 21:
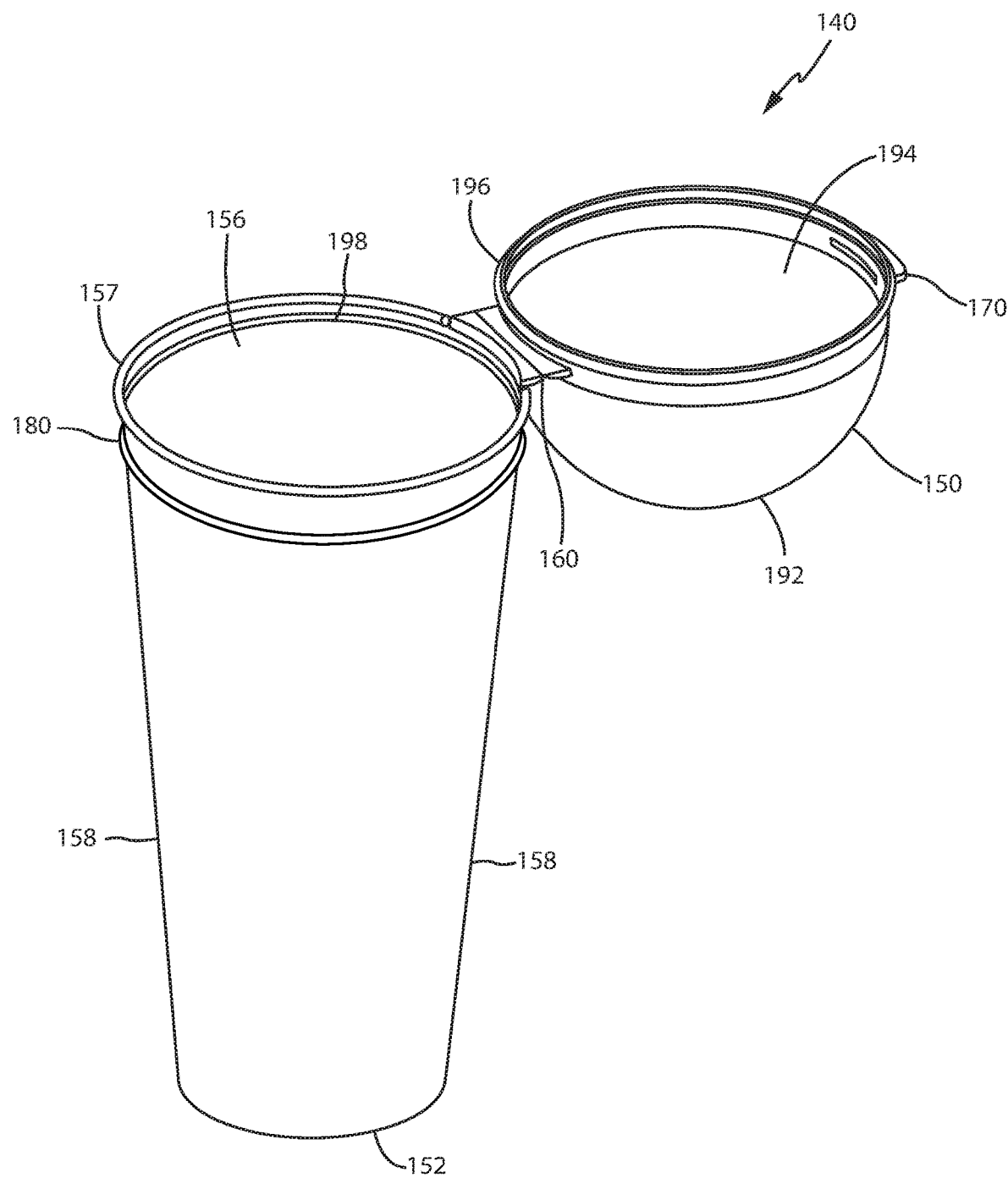
FIG. 21 is a perspective view of a cup with a living hinge and a lid having an inner dual seal with a bubble shaped lid with the lid in an open position.

FIG. 5 is a perspective view of a cup 140 with a living hinge 160 and a bubble or dome shaped lid 150 having a dual seal, the inner workings, including the bottom edge of the bubble lid 194, the lip on the bottom edge of the bubble lid 196 that fits into the indentation running the circumference of the inner portion of the cup 198 of which are shown in FIG. 21, and the outer portion of the dual seal structure 180 where the lip on the bottom edge of the bubble lid fits securely within is shown. This embodiment 140 has a lower, receptacle portion 152 having a base 154, an open top 156, and side walls 158 in between the base 154 and the open top 156, the base 154 having a smaller diameter than the top 156, the side walls 158 forming a cylinder from the base 154 to the open top 156 and creating an inner and outer portion of the cup, the open top 156 having an upper edge 157 defining the outermost circumference of the open top 156 and a living hinge 160 with a flexible radius.

The living hinge 160 molded in the upper edge 157 of the open top 156 attached to the lower receptacle portion 152 and a bubble or dome shaped lid 150, the living hinge 160 allowing the lid 150 to flex over the open top 156 wherein the lid 150 securably fits into the indentation that runs the full circumference of the inner portion of the cup 198.

The lid 150 has a top surface 192 and a bottom edge 194 of a size and shape to securely fit into the inner circumference of the open top of the cup, the top surface of the lid 192 having a bubble shape 150 rising from the outermost circumference of the open top 156, the circumference around the bottom surface of the lid 164 having a lip 196 extending down from the circumference of the lid, the lip 196 creating a dual seal structure having a bottom edge 196 that fits in the indentation that runs the full circumference of the inner portion of the cup 198 and a top edge 192 that is the same size and shape as the inner circumference of the upper edge of the top, the top edge 192 having one or more l-shaped tabs extending from the top edge up and over the upper edge of the cup 157. As in the other embodiments, the living hinge 160 permits the lid 150 to bend along a line of the hinge to flexibly secure the lid 150 to the lower receptacle portion 152 and prevent leakage of the material held therein.

The inside of the cup 140 may have an inner concentric circle 200 as described in embodiment 10 to enhance the ease of stacking, storing, and removing or separating the cups from one another.

Figure 6:
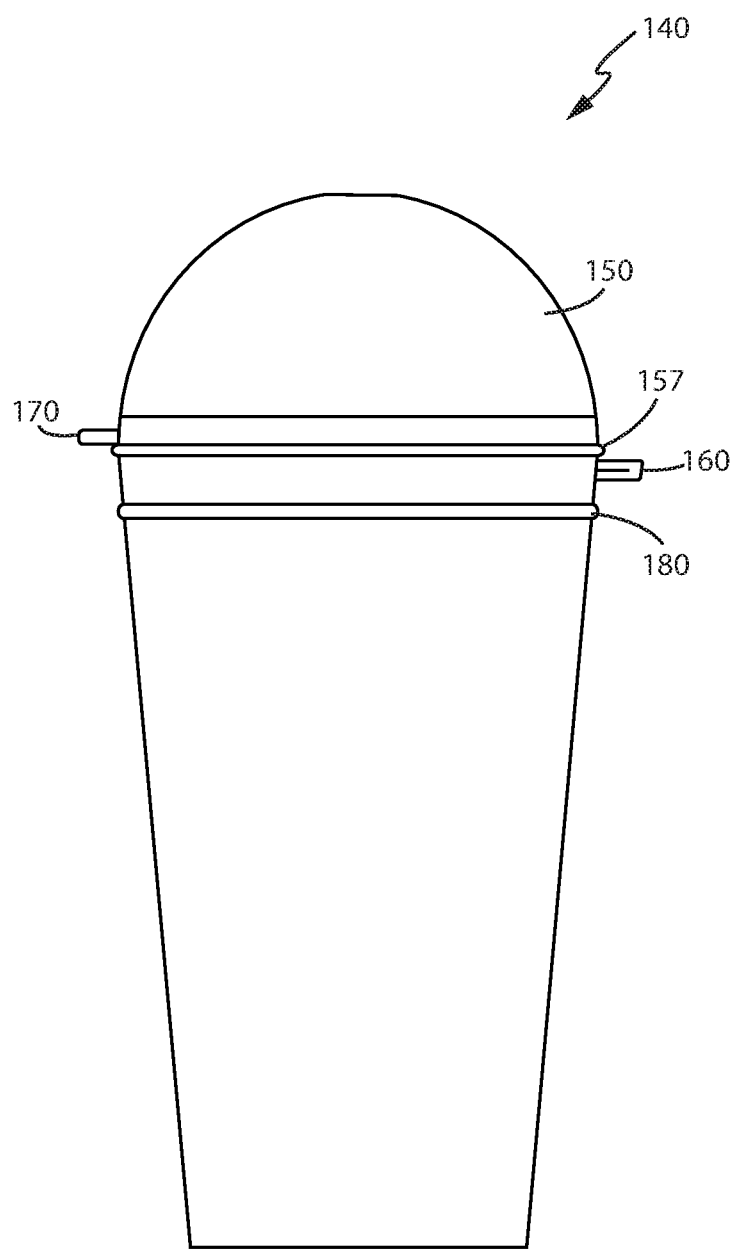
FIG. 6 is a side view thereof.

FIG. 6 is a side view of the cup 140 with a living hinge 160 and a bubble or dome shaped lid 150. The dome shaped lid 150 fits within the inside of the cup and inside the upper outer edge of the top of the cup 157. A tab 170 on the lid 150 assists in opening and closing the lid 150. The outer rib of the seal structure on the bottom portion of the cup 180 is shown. This receives the lip on the bottom edge of the lid and another secure closure is created at the juncture of the bottom edge of the lid and the inside of the cup so that a dual seal is created with the lip and the juncture between the bottom edge of the lid and the inside of the cup.

Figure 7:
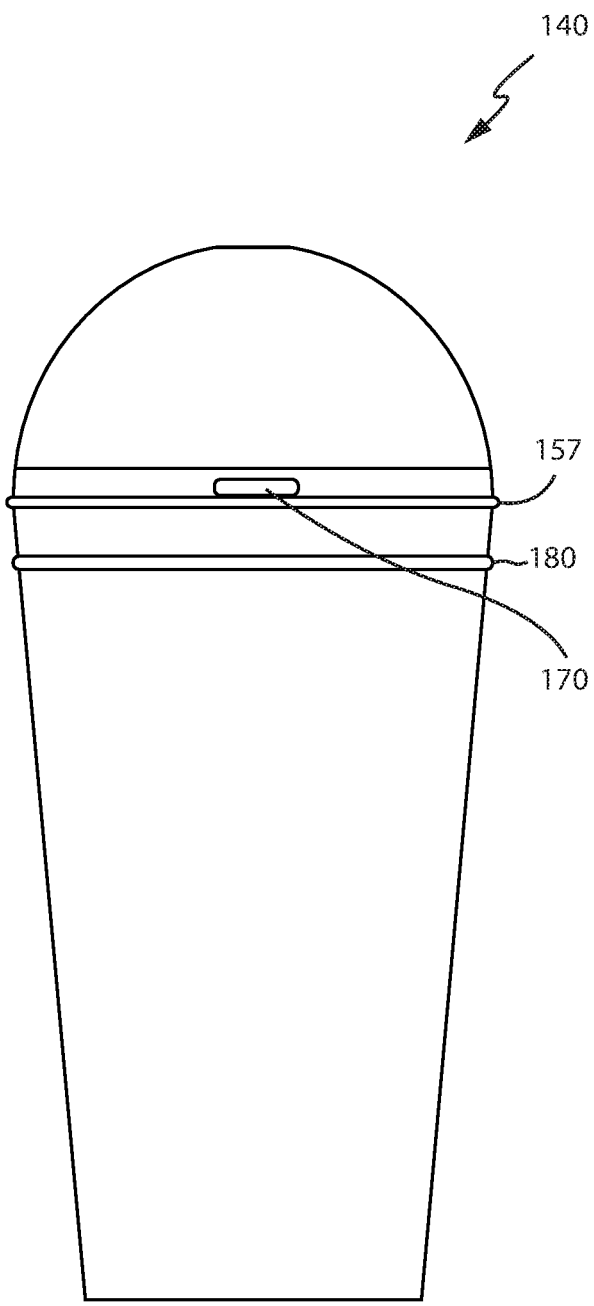
FIG. 7 is a front view thereof.

FIG. 7 is a front view of the cup 140 with a living hinge and a bubble or dome shaped lid 150 having an inner dual seal showing a tab 170, the upper edge of the cup 157 within which the dome shaped lit fits and the outer rib 180 of the inner indentation of the lower component of the inner dual seal.

Figure 8:
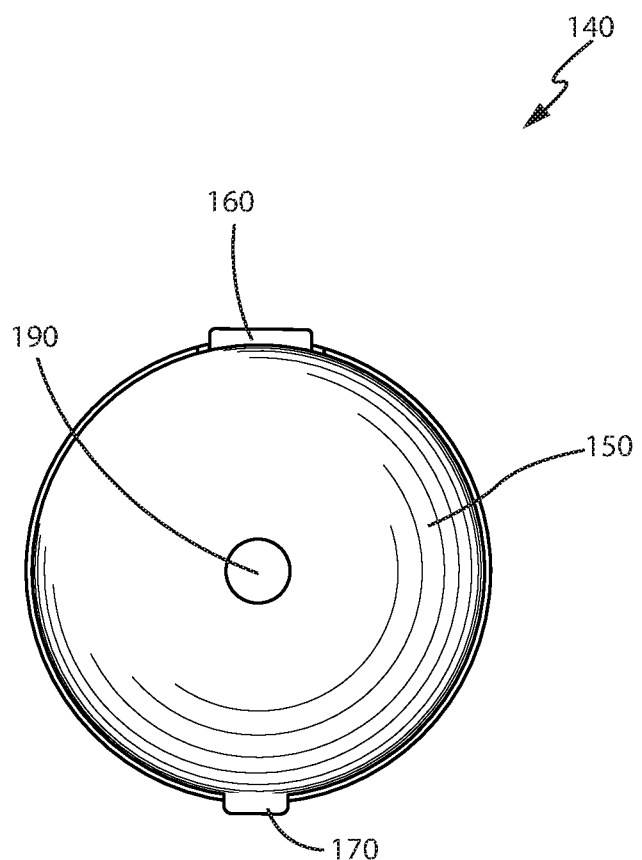
FIG. 8 is a top view thereof.

FIG. 8 is a top view of the cup 140 with a living hinge and a bubble or dome shaped lid 150 in the closed position showing the living hinge 160 a tab 170 and an opening 190 in the top of the lid for receiving a straw.

Figure 9:
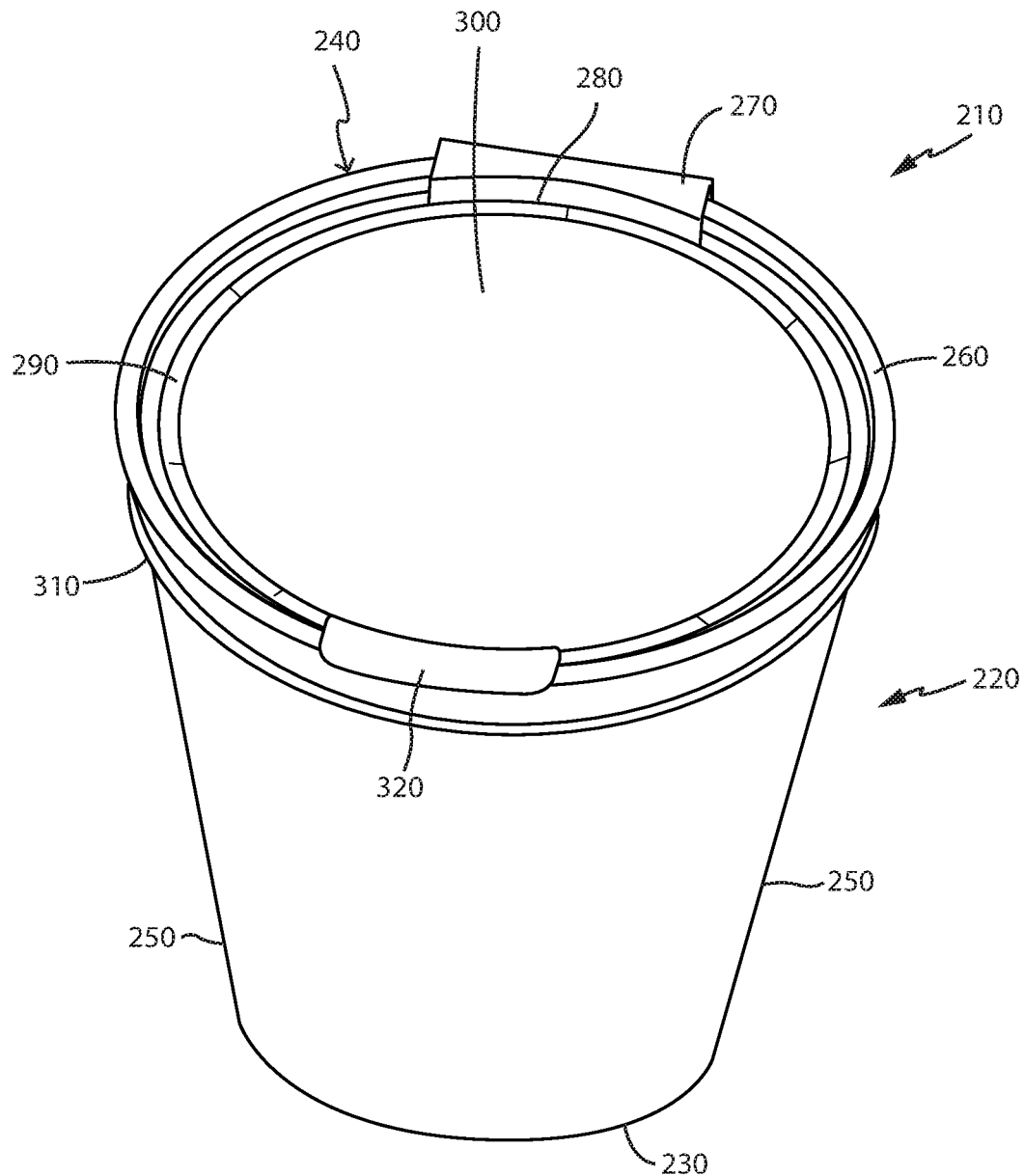
FIG. 9 is a perspective view of a round-bottomed container with a living hinge and a lid having an inner dual seal with an indented lid.

FIG. 9 is a perspective view of a round-bottomed container 210 with a living hinge and a lid having an inner dual seal with an indented lid. The molded, sealable container 210 for holding liquid or food has a lower, receptacle portion 220 having a base 230, an open top 240, and side walls 250 in between the base 230 and the open top 240, the base 230 having a smaller area than the top 240, the side walls 250 extending from the base 230 to the open top 240 and creating an inner and outer portion of the container 210, the open top 240 having an upper edge 260 defining the outermost circumference of the open top 250 and a living hinge 270 with a flexible radius 280 and an indentation that runs the full circumference of the inner portion of the container below the upper edge 308.

The living hinge 270 is molded in the upper edge 260 of the open top 240 attached to the lower receptacle portion 220 and a lid 300, the living hinge 270 allowing the lid 300 to flex over the open top 240 wherein the lid 300 securably fits into the indentation 308 that runs the full circumference of the inner portion of the container. The upper edge 260 of the open top has arcuate edges on either side of the living hinge 270 that allow for ease of opening the lid 300, provide less wear and tear on the lid 300 and lower receptacle portion 220 with repeated opening and closing, and provide for ease of manufacturing and less impact on the machines used to manufacture the containers 210. Also, the arcuate edges, and shape of the living hinge aid in keeping the contents of the container within the container when the lid 300 is opened and closed.

Figure 25:
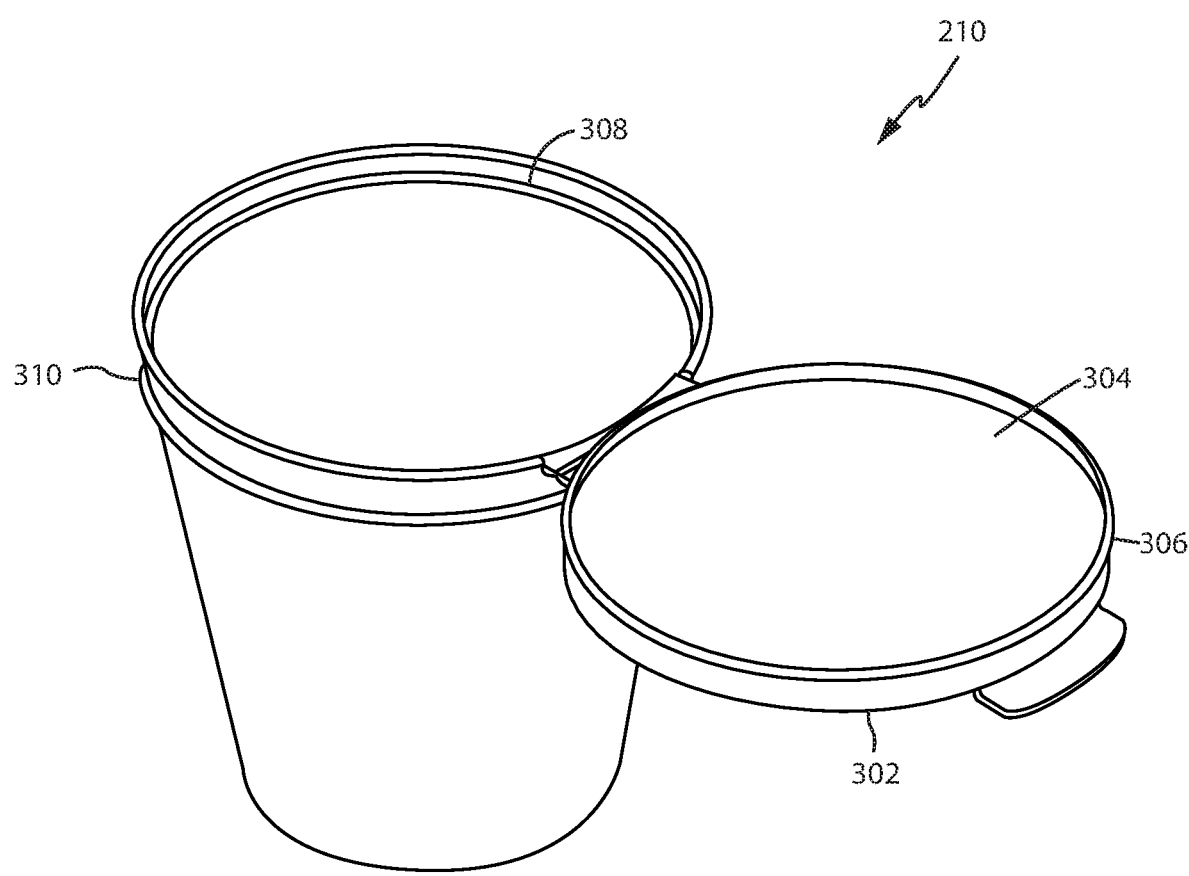
FIG. 25 is a perspective view of a round-bottomed container with a living hinge and a lid having an inner dual seal with an indented lid with the lid in an open position.
Figure 26:
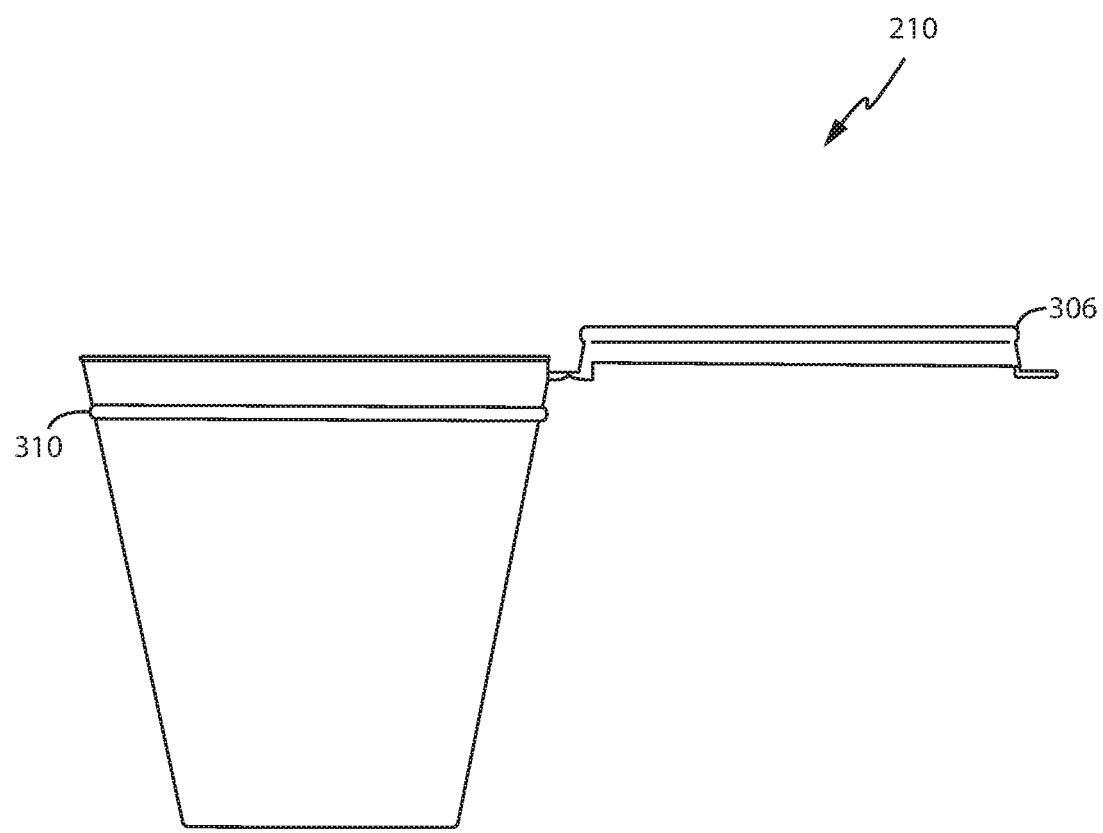
FIG. 26 is a side view thereof.

The lid 300 has a top surface 302 and a bottom surface 304 of a size and shape to securably fit into the inner circumference of the open top 240 of the container, the top surface of the lid 302 being sloped downward from the outermost circumference of the open top to the center of the lid 290. As shown in FIGS. 25 and 26, the circumference around the bottom surface of the lid 304 having a lip 306 extending down from the circumference of the lid, the lip 304 creating a dual seal structure having a bottom edge that fits in the indentation 308 that runs the full circumference of the inner portion of the container and a top edge 302 that is the same size and shape as the inner circumference of the upper edge of the top, the top edge having one or more l-shaped tabs 320 extending from the top edge up and over the upper edge of the container 210. The outside of the indentation that receives the lip of the lid is shown 310. This is a portion of the inventive dual seal structure that ensures a secure fit of the lid into the container and prevents leakage, spillage, and helps to stabilize the cup.

Figure 10:
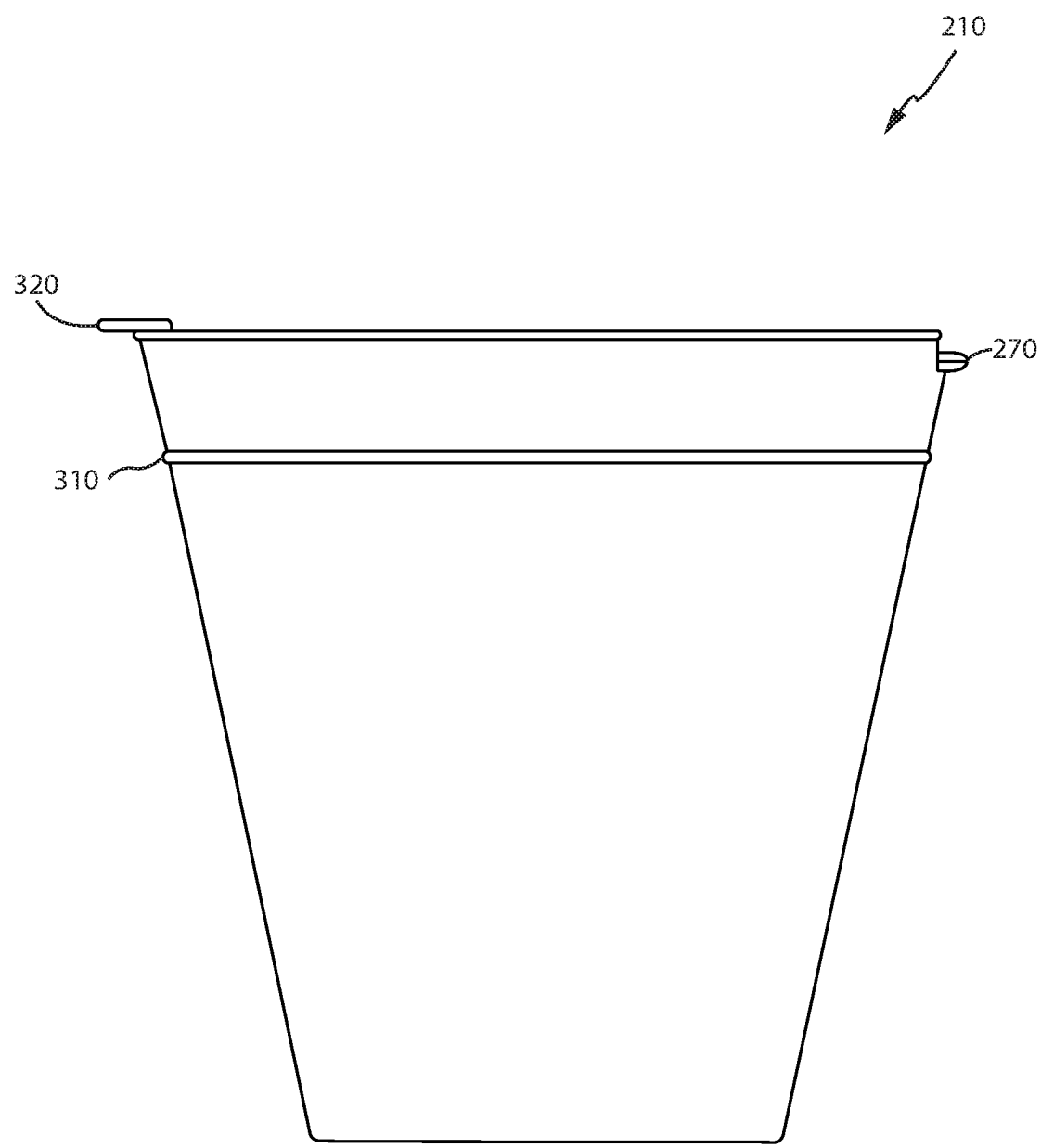
FIG. 10 is a side view thereof.

FIG. 10 is a side view of a round-bottomed container 210 with a living hinge 270 and a lid with a tab 320 having an inner dual seal, an outside rib 310 of which is shown.

Figure 11:
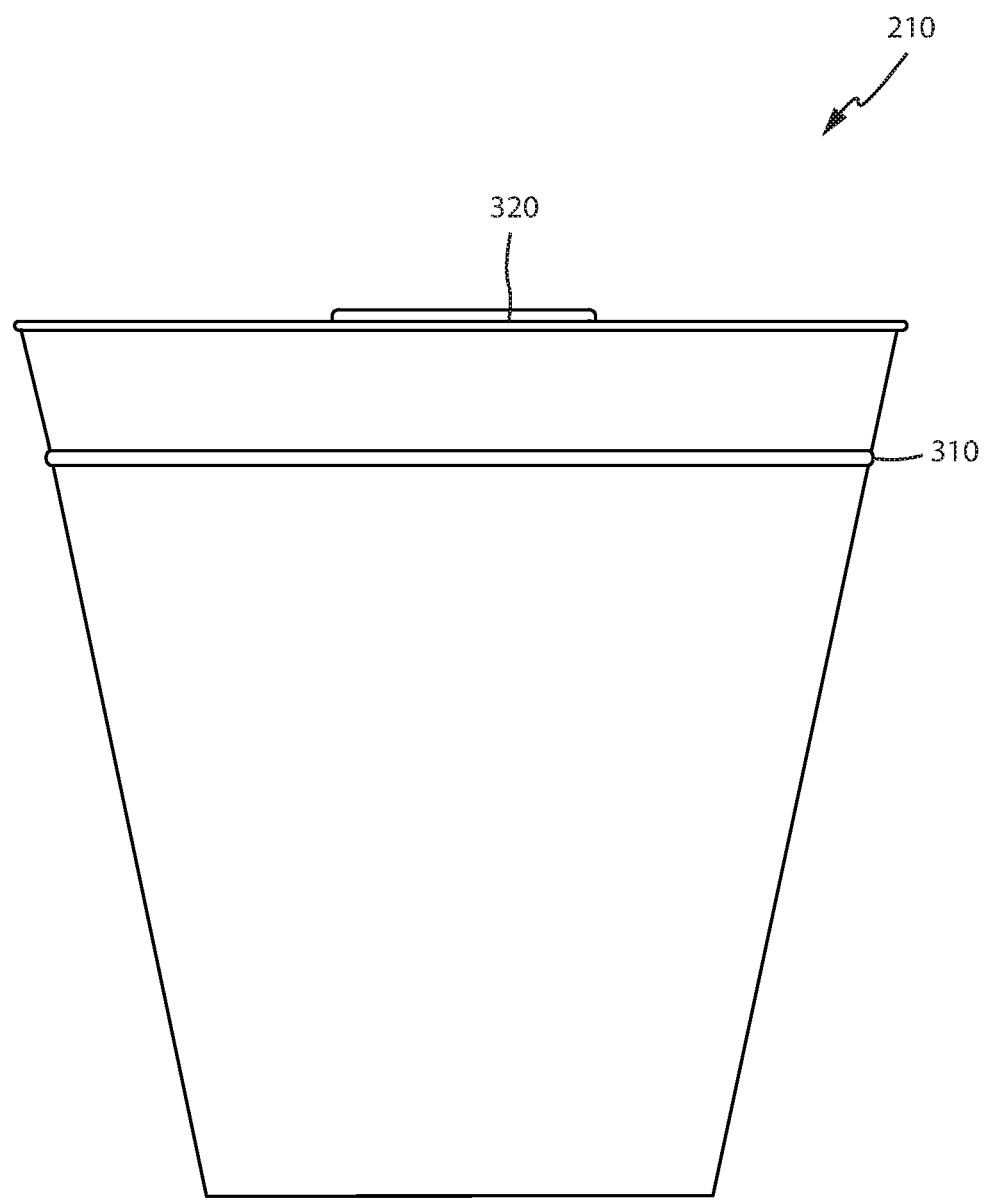
FIG. 11 is a front view thereof.

FIG. 11 is a front view of a round-bottomed container 210 with the lid in the closed position, a tab 320 and an inner dual seal, an outside rib of which is shown 310.

Figure 12:
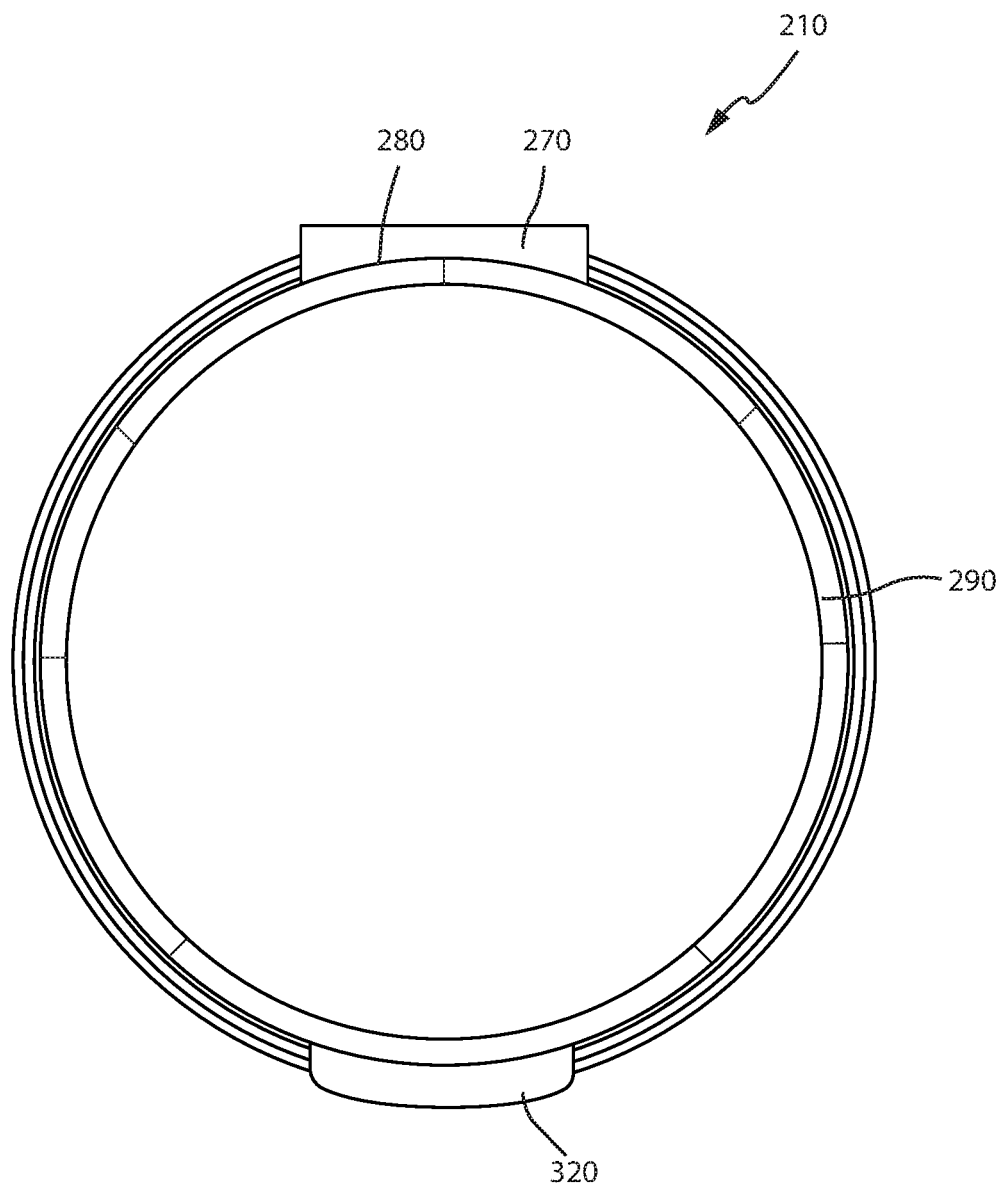
FIG. 12 is a top view thereof.

FIG. 12 is a top view of a round-bottomed container 210 with the lid in the closed position with a living hinge 270, a flexible radius 280, and a fluid diverter 290 that runs the entire circumference of the top edge of the lid at the juncture of the seal between the cup and the lid. A tab 320 on the lid is also shown.

Figure 13:
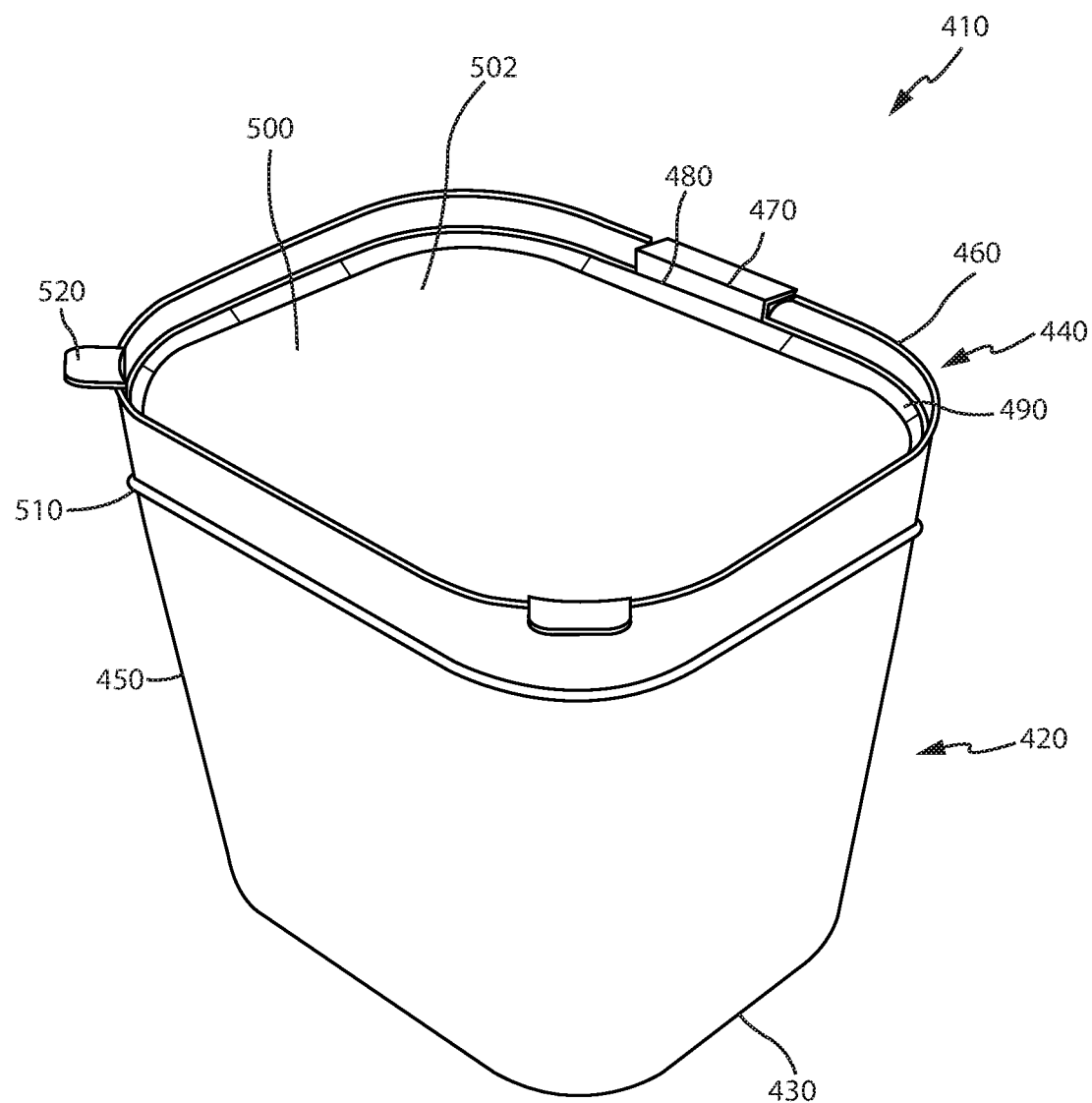
FIG. 13 is a perspective view of a substantially rectangular-bottomed container with a living hinge and a lid having an inner dual seal with an indented lid.
Figure 29:
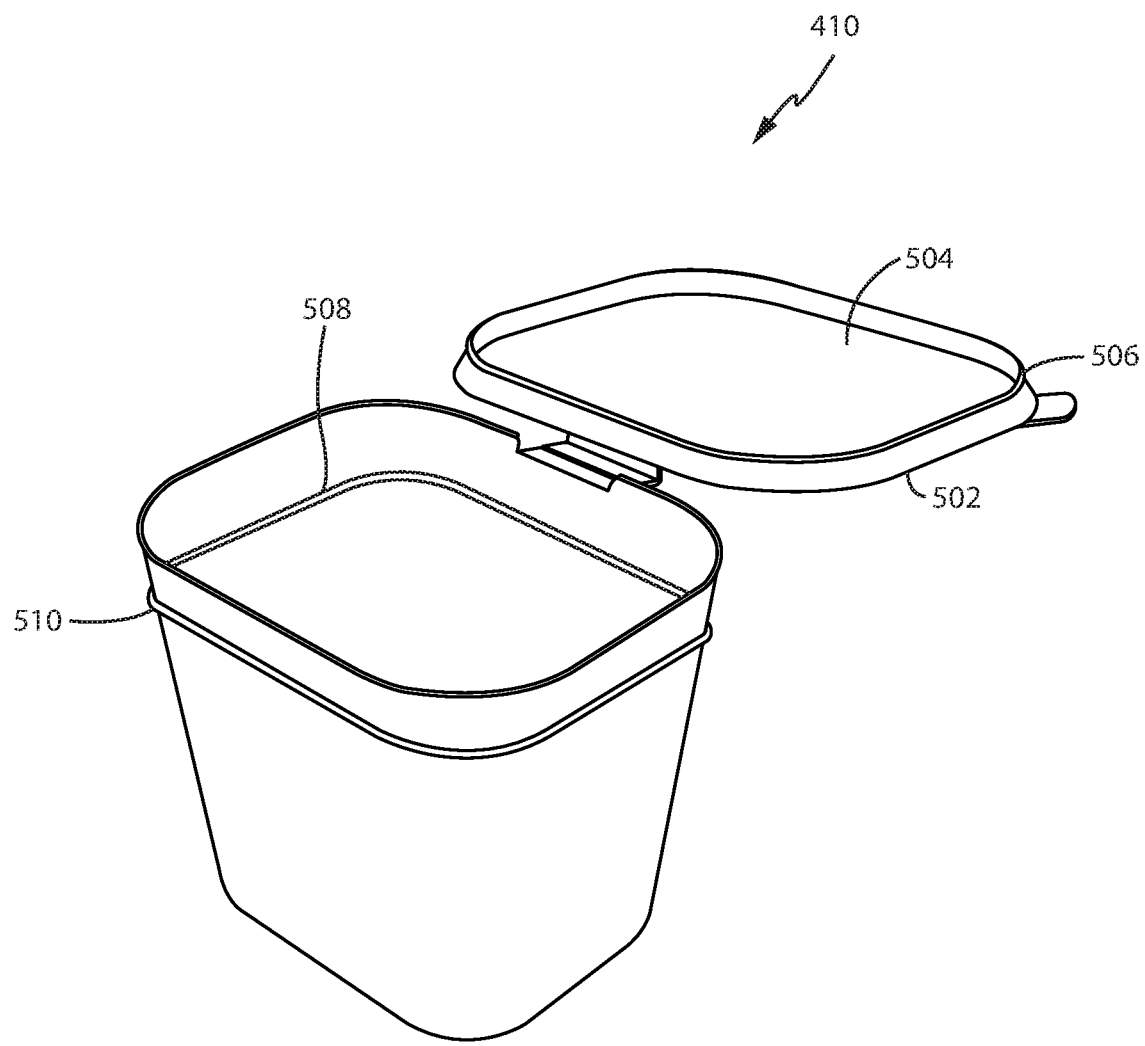
FIG. 29 is a perspective view of a substantially rectangular-bottomed container with a living hinge and a lid having an inner dual seal with an indented lid with the lid in an open position.
Figure 30:
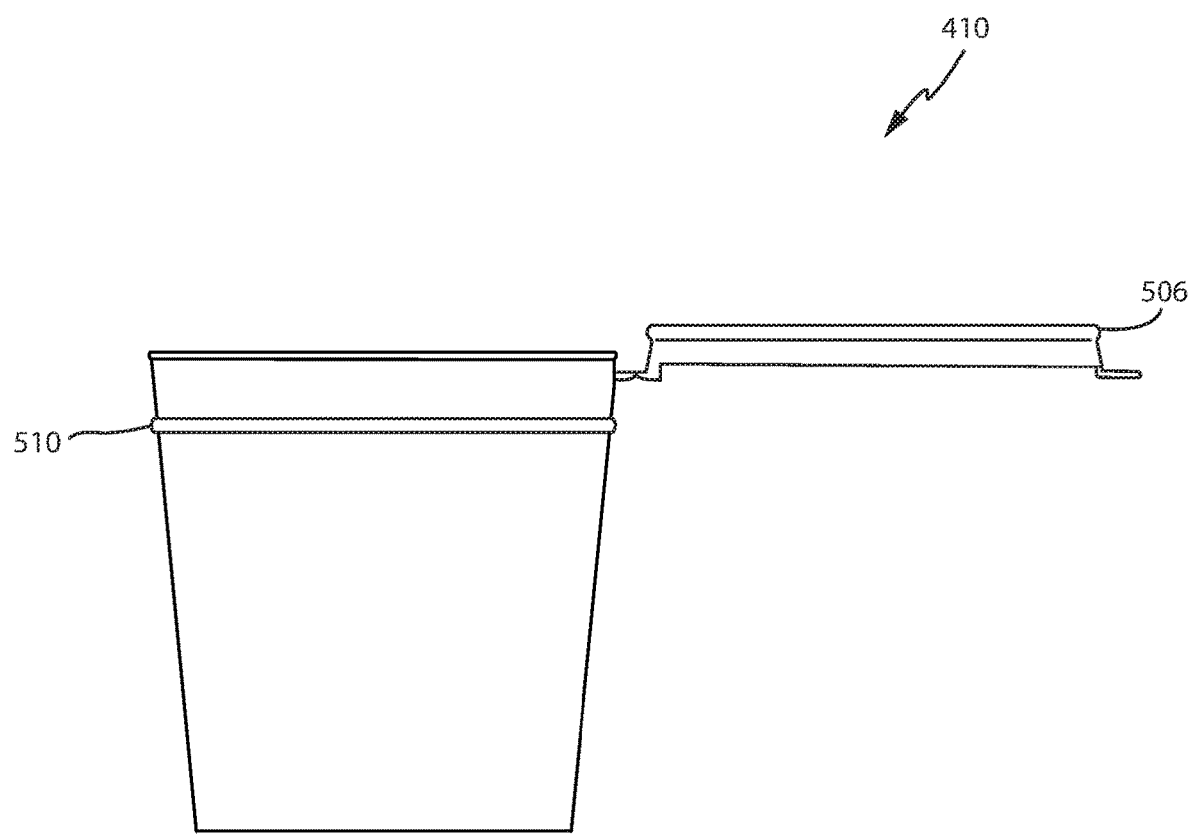
FIG. 30 is a side view thereof.

FIG. 13 is a perspective view of a substantially rectangular-bottomed container 410 with a living hinge 470 and a lid 500 having an inner dual seal comprised shown in detail in FIGS. 29 and 30 with an indentation or fluid diverter 490 on the top surface of the lid 502 to draw fluid away from the seal. The molded, sealable container 410 for holding liquid or food has a lower, receptacle portion 420 having a base 430, an open top 440, and side walls 450 in between the base 430 and the open top 440, the base 430 having a smaller area than the top 440, the side walls 450 extending from the base 430 to the open top 440 and creating an inner and outer portion of the container 410, the open top 440 having an upper edge 460 defining the outermost circumference of the open top 450 and a living hinge 470 with a flexible radius 480 and an indentation that runs the full circumference of the inner portion of the container below the upper edge 508 as shown in FIG. 29.

The living hinge 470 is molded in the upper edge 460 of the open top 440 attached to the lower receptacle portion 420 and a lid 500, the living hinge 470 allowing the lid 500 to flex over the open top 440 wherein the lid 500 securably fits into the indentation 508 that runs the full circumference of the inner portion of the container. The upper edge 460 of the open top has arcuate edges on either side of the living hinge 470 that allow for ease of opening the lid 500, provide less wear and tear on the lid 500 and lower receptacle portion 420 with repeated opening and closing, and provide for ease of manufacturing and less impact on the machines used to manufacture the containers 410. Also, the arcuate edges, and shape of the living hinge aid in keeping the contents of the container within the container when the lid 500 is opened and closed.

The lid 500 has a top surface 502 and a bottom surface 504 of a size and shape to securably fit into the inner circumference of the open top 540 of the container, the top surface of the lid 502 being sloped downward from the outermost circumference of the open top to the center of the lid 490. As shown in FIGS. 29 and 30, the circumference around the bottom surface of the lid 504 having a lip 506 extending down from the circumference of the lid, the lip 504 creating a dual seal structure having a bottom edge that fits in the indentation 508 that runs the full circumference of the inner portion of the container and a top edge 502 that is the same size and shape as the inner circumference of the upper edge of the top, the top edge having one or more l-shaped tabs 320 extending from the top edge up and over the upper edge of the container 410. The outside of the indentation that receives the lip of the lid is shown 510. This is a portion of the inventive dual seal structure that ensures a secure fit of the lid into the container and prevents leakage, spillage, and helps to stabilize the cup. The container 410 may also have one or more tabs 520 to facilitate opening and closing.

Figure 14:
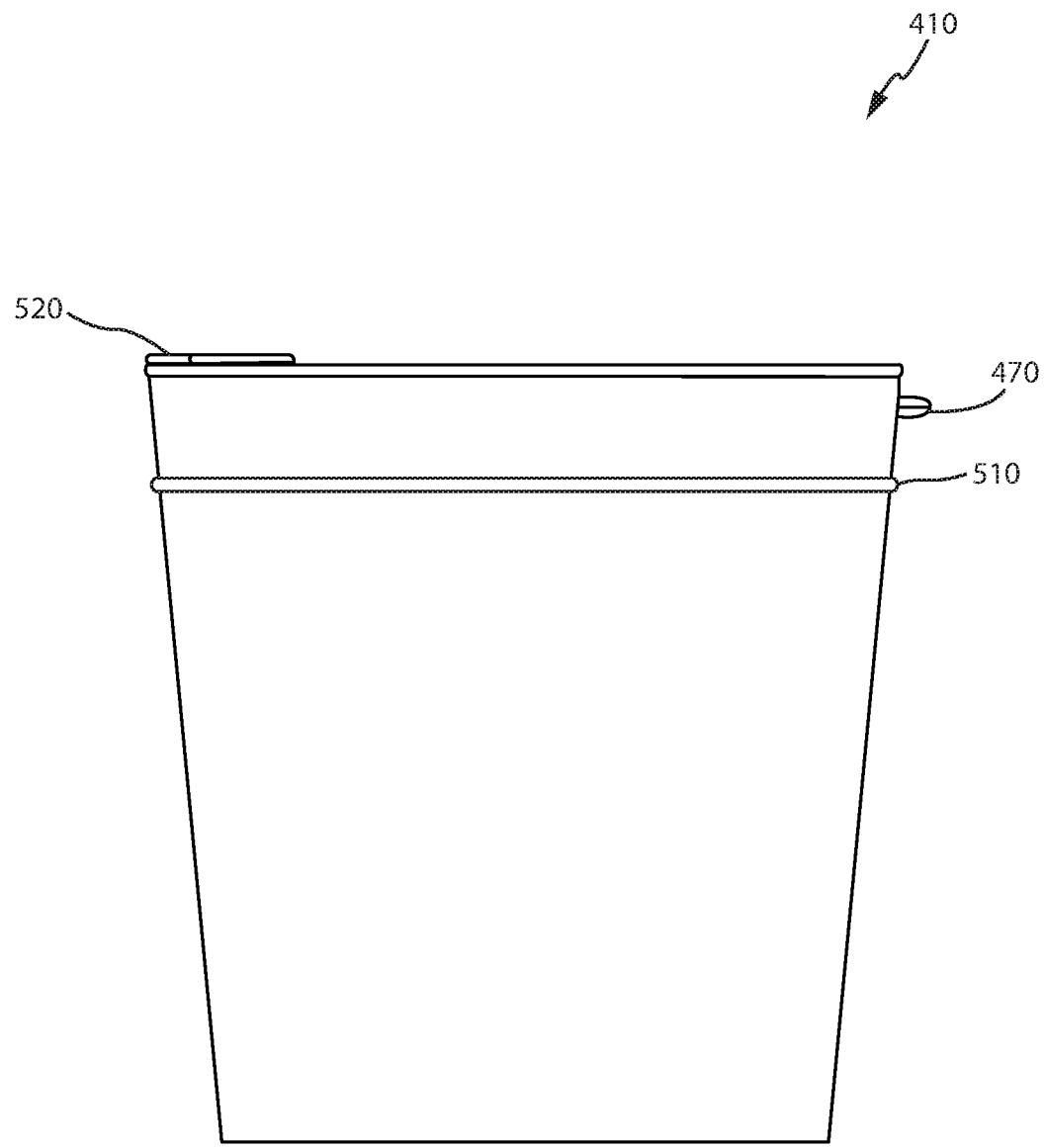
FIG. 14 is a side view thereof.

FIG. 14 is a side view of a substantially rectangular-bottomed container 410 with a living hinge 470 and a lid having an inner dual seal and a tab 520 to assist opening and closing of the lid. The lid fits inside the container as described herein and the outside rib of one component portion of the dual seal is shown 510.

Figure 15:
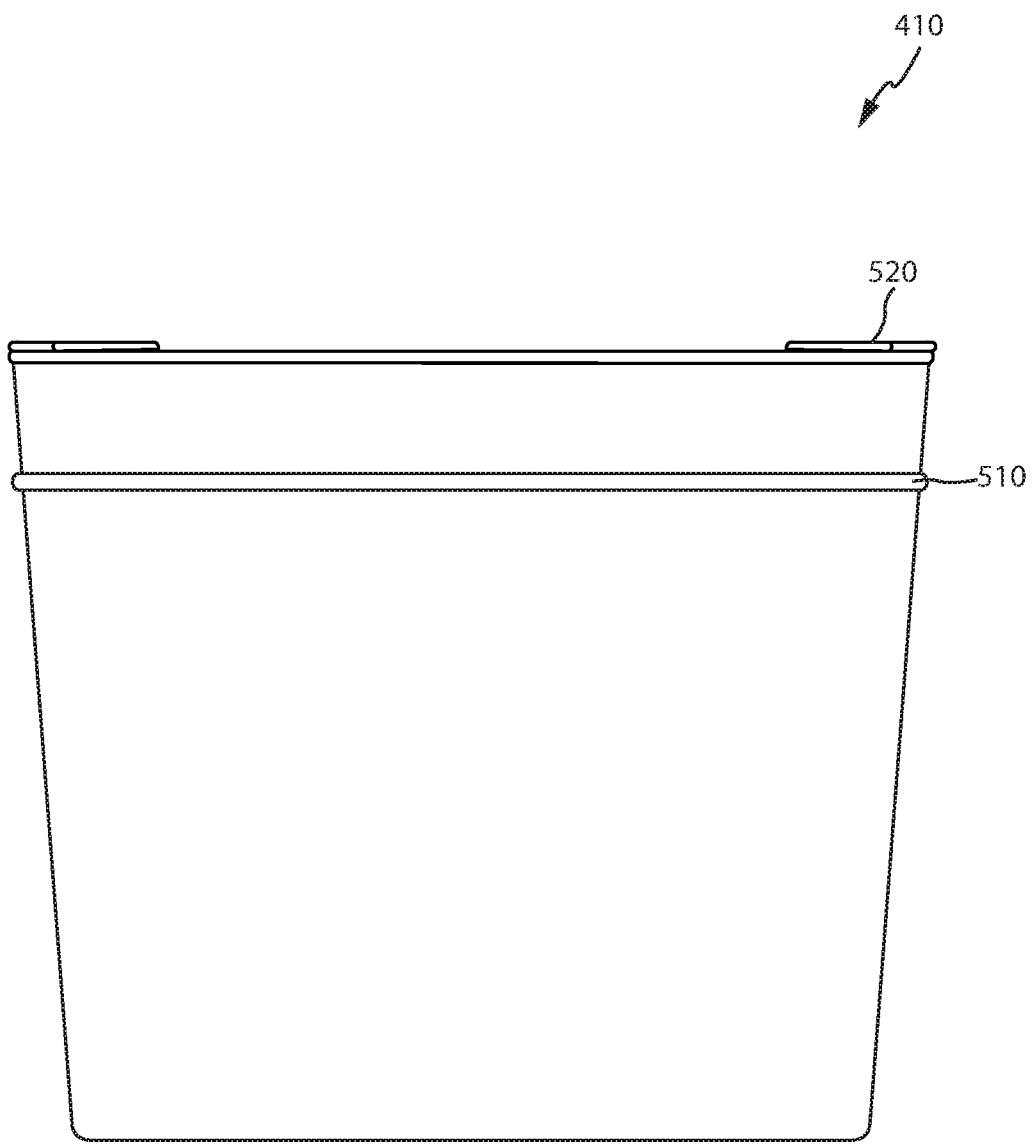
FIG. 15 is a front view thereof.

FIG. 15 is a front view of a substantially rectangular-bottomed container 410 showing tabs 520 and the outside of the one component portion of the dual seal 510.

Figure 16:
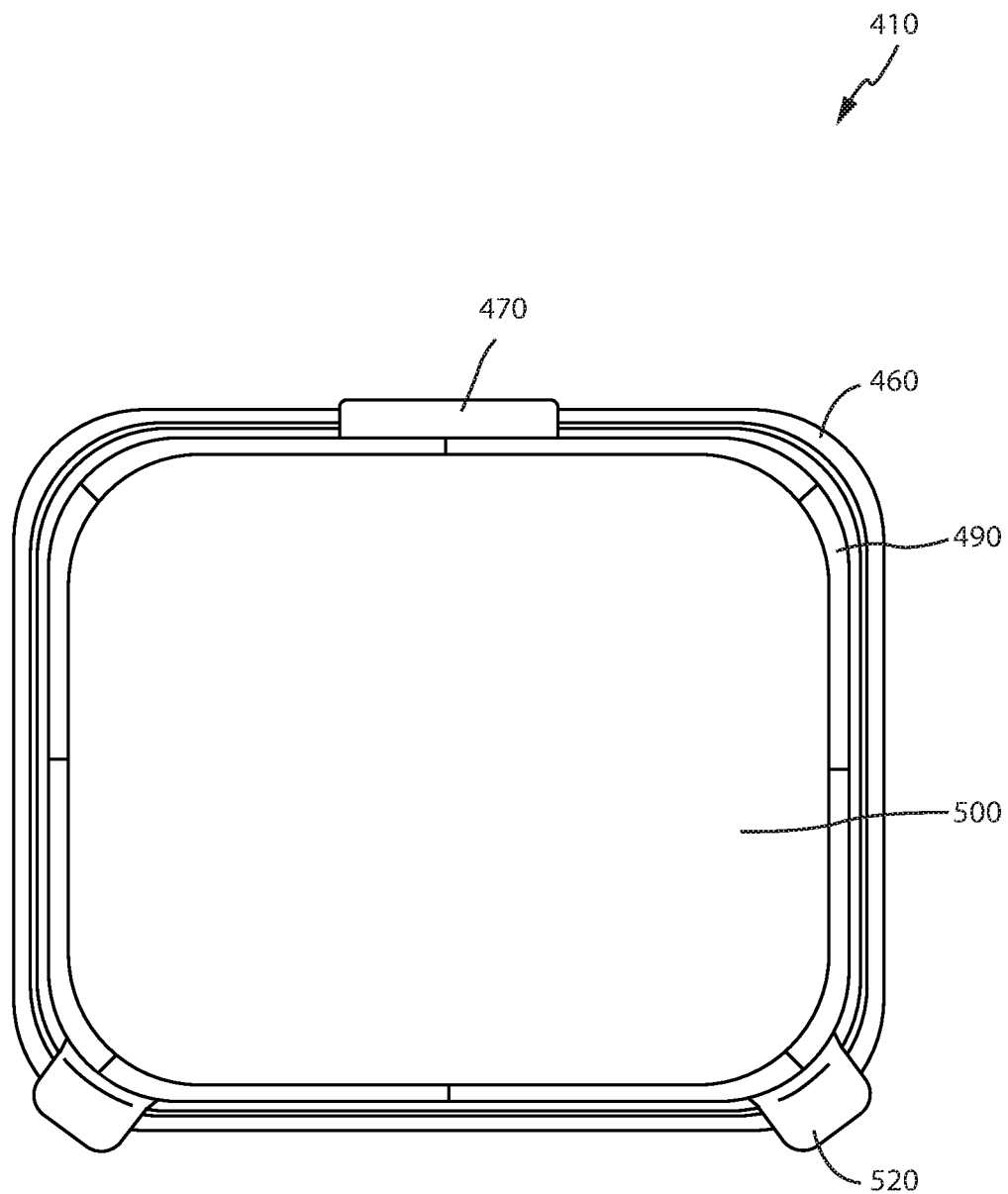
FIG. 16 is a top view thereof.

FIG. 16 is a top view of a substantially rectangular-bottomed container 410 with the upper edge of the container 460 having a living hinge 470, and a lid 500 in the closed position having a fluid diverter in a substantially rectangular shape following the overall shape of the container 490 that is diagonally positioned to divert fluid away from the seal. The top also shows a tab 520.

Figure 17:
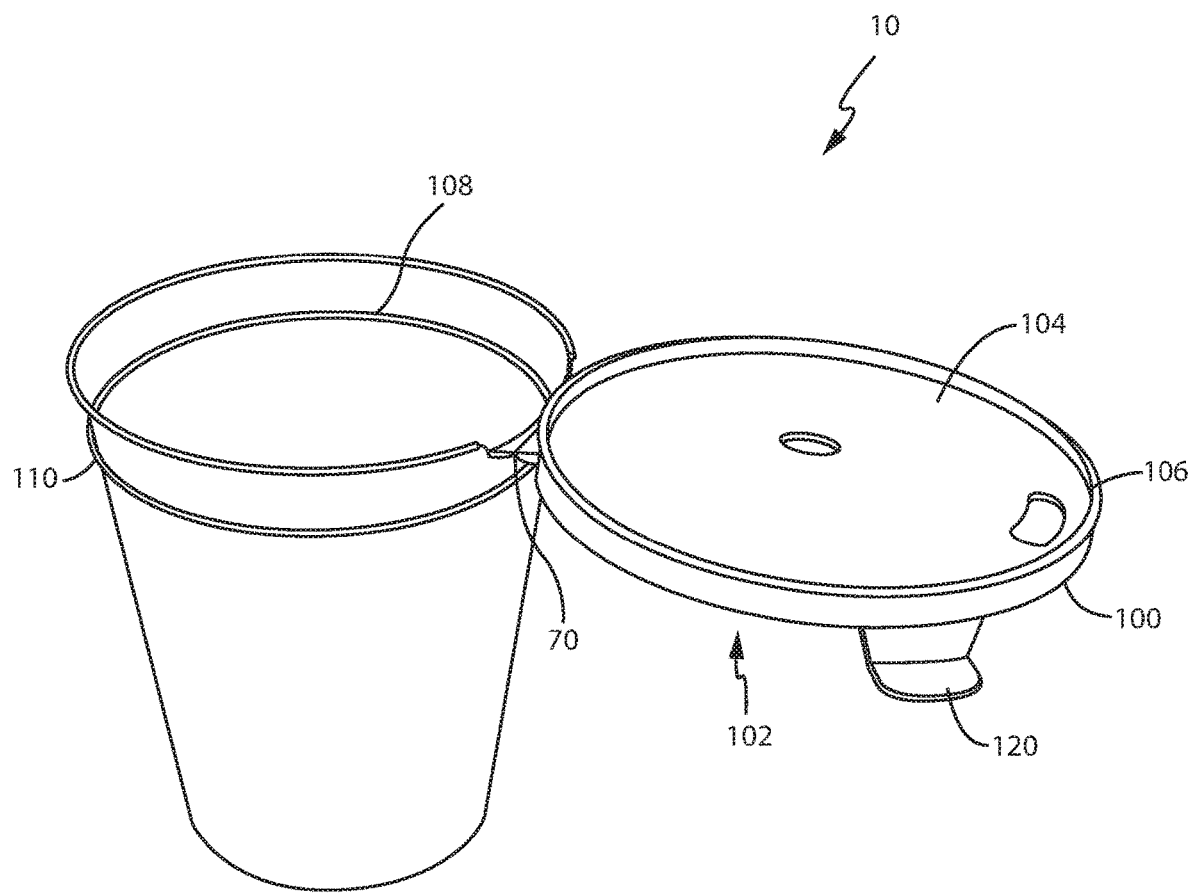
FIG. 17 is a perspective view of a cup with a living hinge and a lid having an inner dual seal with an indented lid with the lid in an open position

FIG. 17 is a perspective view of a cup 10 with a living hinge 70 and a lid 100 in the open position having an inner dual seal comprised of the friction fit of the edge of the lid and the lip 106 on the bottom edge of the lid 104 that fits within the indentation running the circumference of the inner portion of the cup 108. The edge of the lid is approximately 1-14 mm, preferably around 2-6 mm in length. The top of the lid is 102 has an l-shaped tab 120 to ease opening and closing. Also, the outside of one component of the dual seal structure 110 is shown as a rib running the full outer circumference of the lower portion of the cup.

Figure 18:
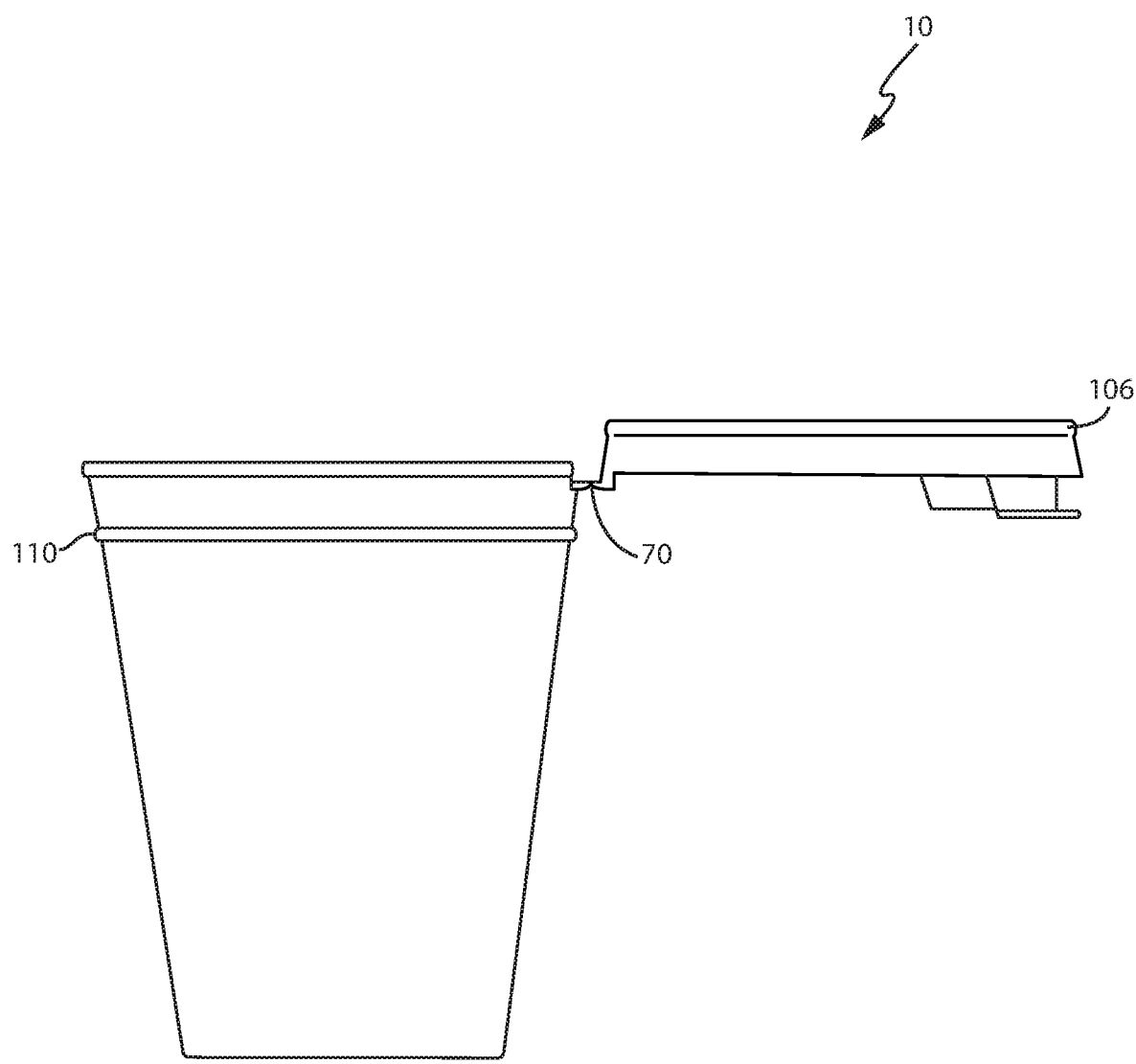
FIG. 18 is a side view thereof.

FIG. 18 is a side view of a cup 10 with a living hinge 70 and a lid in the open position having an inner dual seal, a first component of which is the bottom lip 106 that friction fits into the interior of the cup and the outer rib of this click-fit lip into the interior indentation. The second component part of the dual seal is the top friction fit portion of the lid when the lip 106 is pushed into place and is created because of the size of the edge of the lid next to the lip 106 that is approximately 2-6 mm in length. The size of the edge of the lid will vary depending on how many ounces the cup or containers hold, but in any event the size of the edge will accommodate and achieve the dual seal structure described herein.

Figure 19:
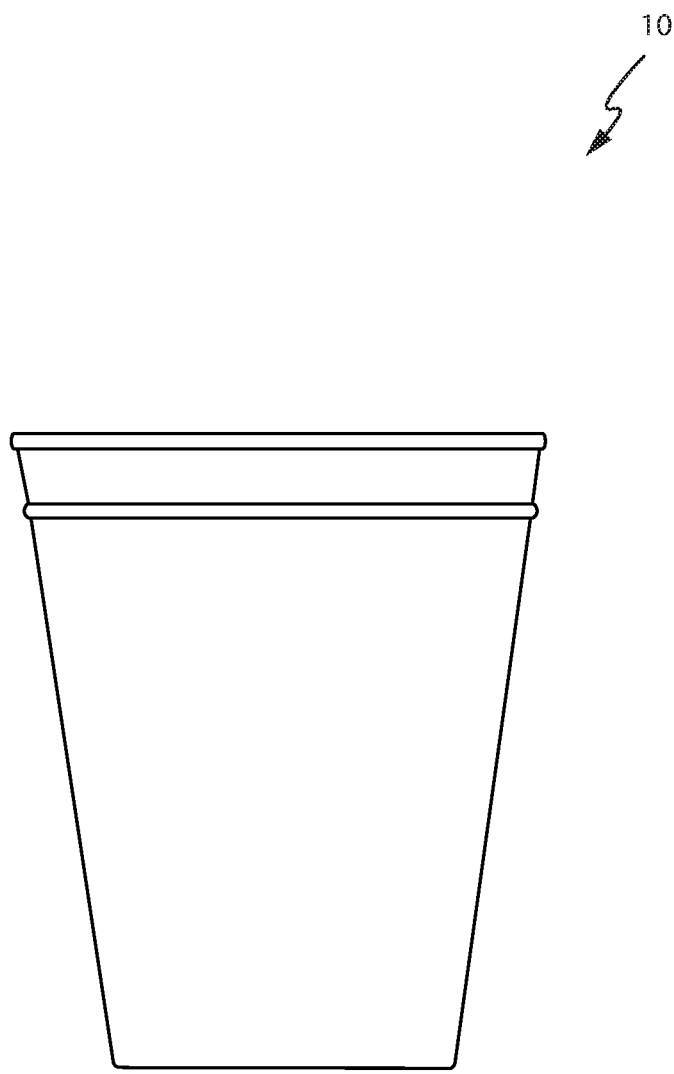
FIG. 19 is a front view thereof.

FIG. 19 is a front view of a cup 10 with the lid in the open position.

Figure 20:
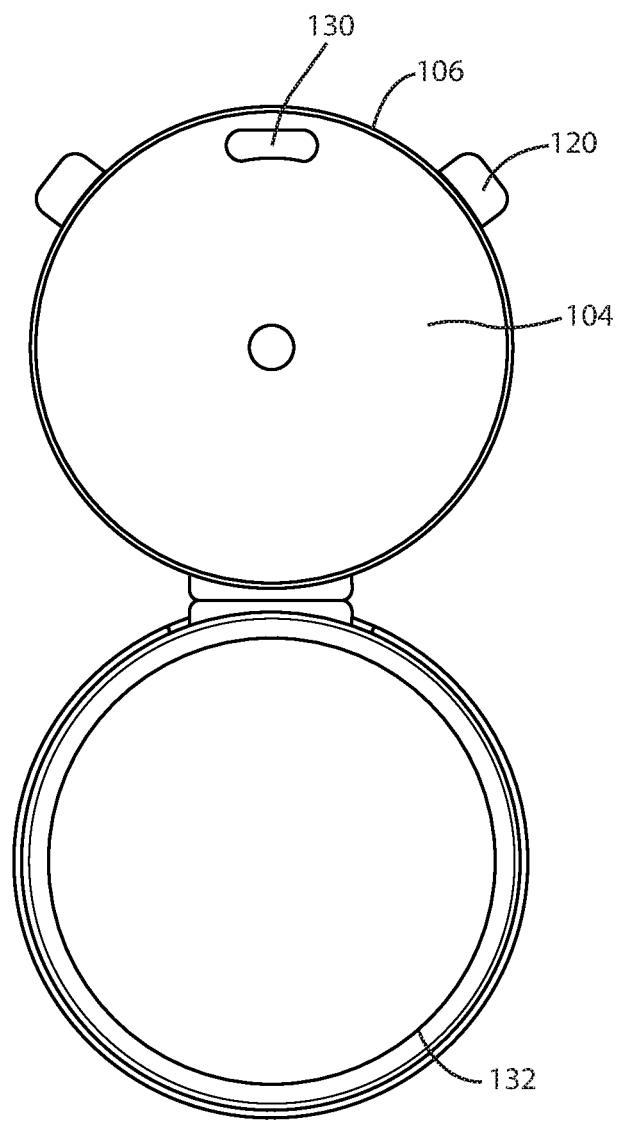
FIG. 20 is a top view thereof.

FIG. 20 is a top view of a cup 10 with a living hinge and a lid in the open position having an inner dual seal, the lower lip edge of which is shown as 106, the bottom of the lid 104, and a small opening in the lid 130 along with an l-shaped tab on the lid are shown. Also, the inner concentric circle 132 is shown just above the inside base of the cup. This is a raised area extending approximately 0.5 cm to 1.5 cm up from the inside base of the cup. It runs the entire circumference of the inside just above the base and ensures easy cup stacking, spacing, manufacture, and removal, and helps to stabilize the cup so that it stands upright when the lid is open. This feature is in all of the inventive cups and containers disclosed herein.

FIG. 21 is a perspective view of a cup 140 with a living hinge 160 and a bubble shaped lid 150 having a top 192 and a bottom 194 with a lip 196 on the bottom edge of the lid 194 that fits into the indentation 198 running the circumference of the inner portion of the cup 156. The lid 150 has a tab 170 to ease opening and closing and fits within the upper edge of the cup 157 and nestles inside into the indentation in order to ensure a secure fit between the lid 150 and the bottom portion of the cup 158. Within the cup and just above the base 152, there is an inner concentric circle (not shown) to aid stacking, spacing, manufacture, removal, and stabilization of the cup.

Figure 22:
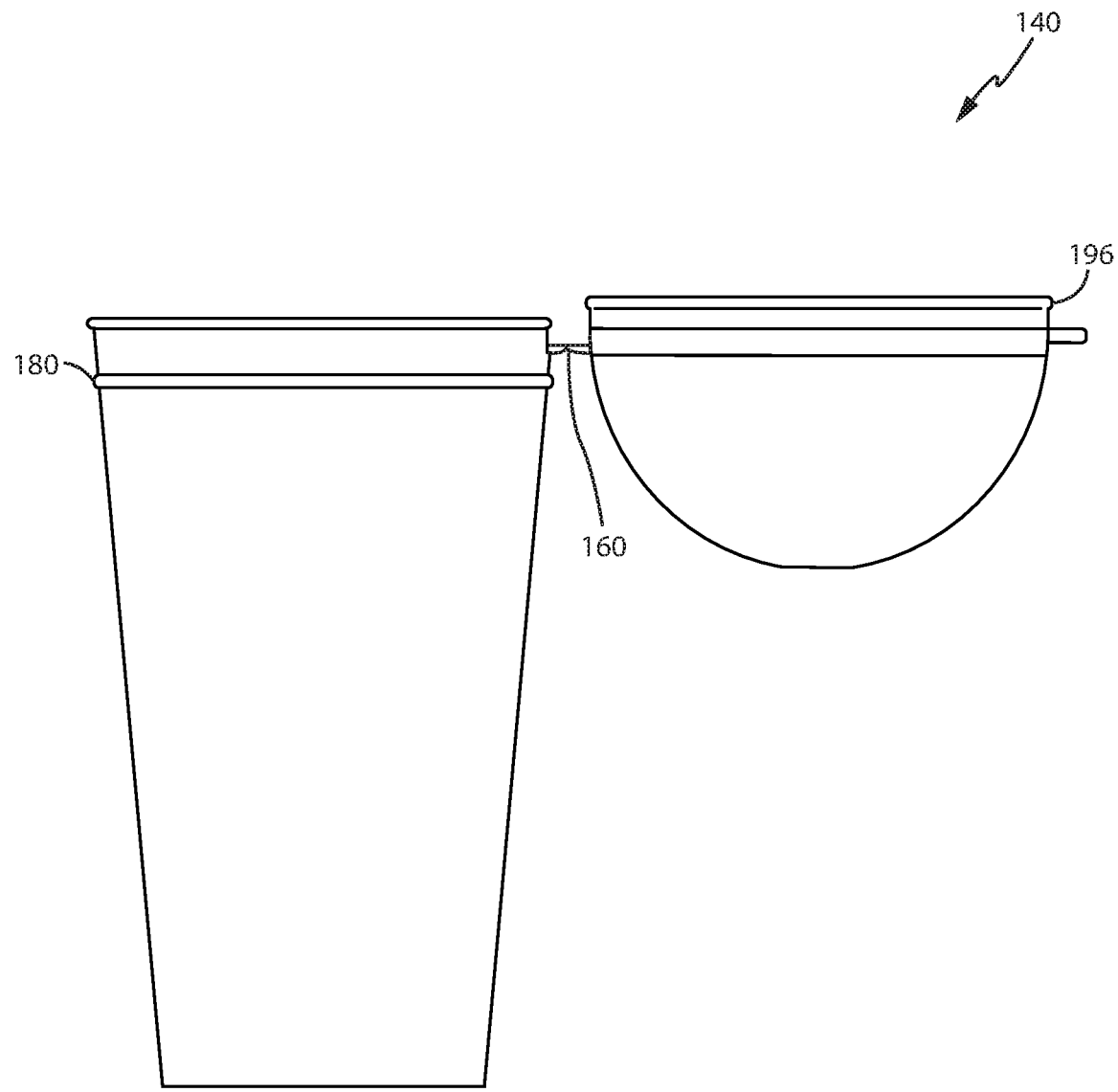
FIG. 22 is a side view thereof.

FIG. 22 is a front view of a cup 140 with a living hinge 160 and a bubble shaped lid wherein the lip 196 and the lid fit within the lower receptacle portion of the cup and the outer portion of the lower component of the dual seal structure is shown 180.

Figure 23:
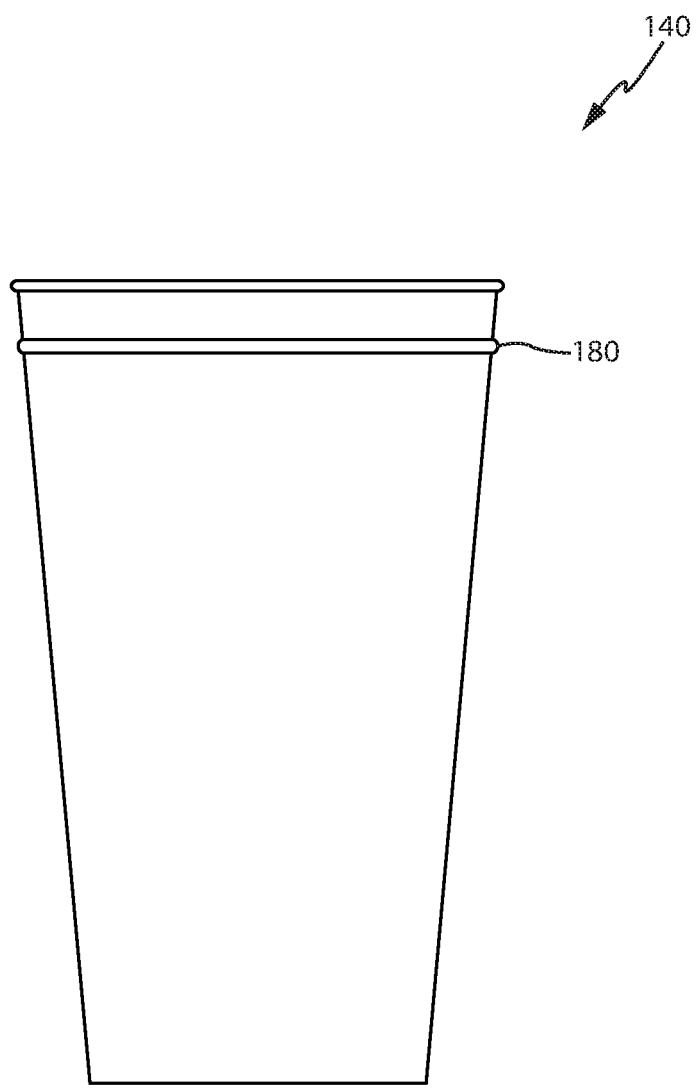
FIG. 23 is a front view thereof.

FIG. 23 is a front view of a cup 140 with a living hinge 160 and a bubble shaped lid with the lid in the open position wherein the lid, when moved at the living hinge fits within the lower receptacle portion of the cup and the outer portion of the lower component of the dual seal structure is shown 180.

Figure 24:
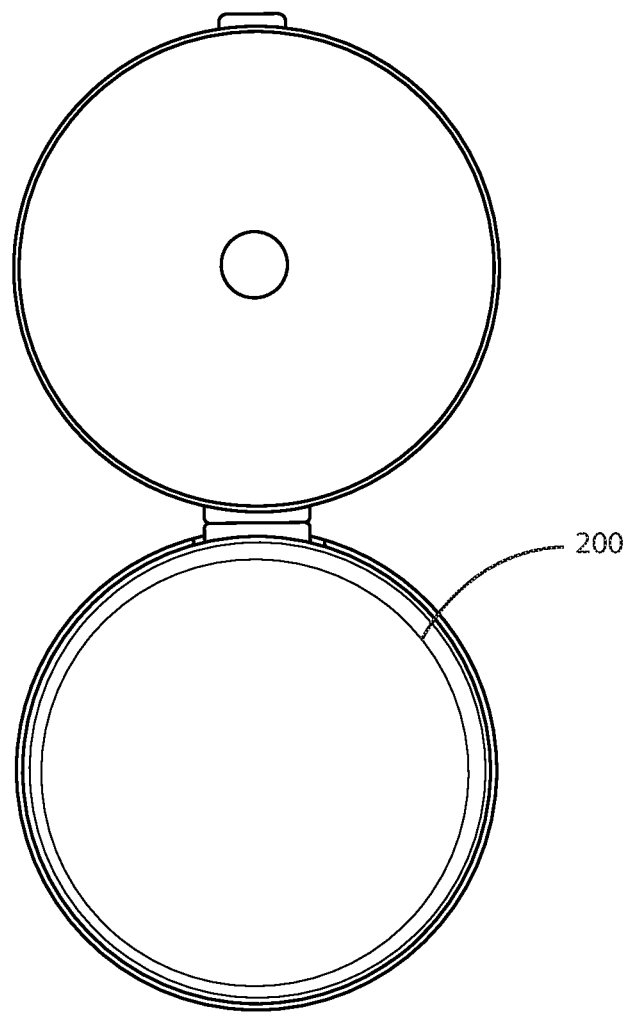
FIG. 24 is a top view thereof.

FIG. 24 is a top view of a cup with a living hinge and a bubble shaped lid in the open position. The inner concentric circle 200 is shown positioned just above the base.

FIG. 25 is a perspective view of a round-bottomed container 210 with a living hinge and a lid in the open position wherein the lip 306 on the bottom side of the lid 304 fits within the indentation on the inside of the container 308, the outside of the indentation is shown, 310, and the top of the lid 302, when pressed down into the container creates a dual seal with the lip 306 and the friction fit of the bottom edge of the lid with the interior portion of the container.

FIG. 26 is a side view of a round-bottomed container 210 with a living hinge and a lid in the open position. The lip 306 on the bottom side of the lid is shown as well as the outside of the indentation 310.

Figure 27:
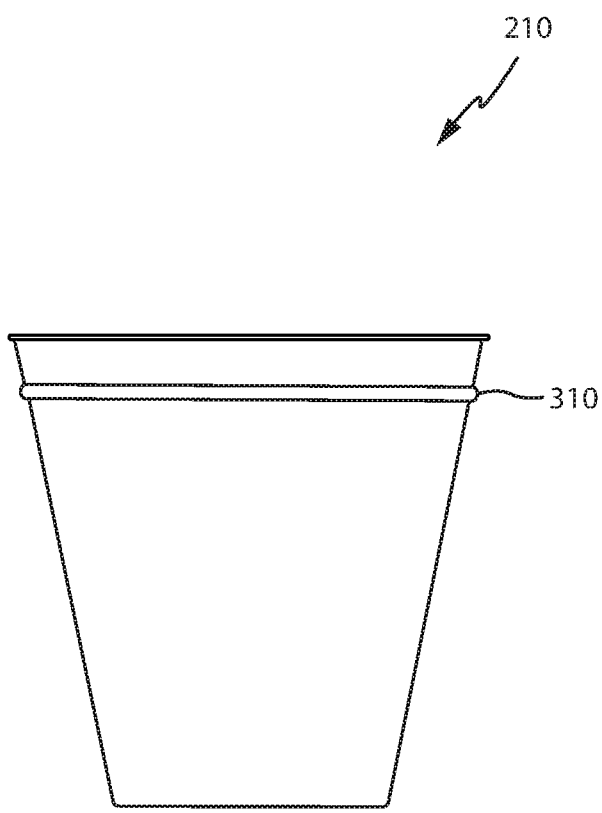
FIG. 27 is a front view thereof.

FIG. 27 is a front view of a round-bottomed container 210 with a living hinge and a lid in the open position, and the outside of the indentation 310 is shown.

Figure 28:
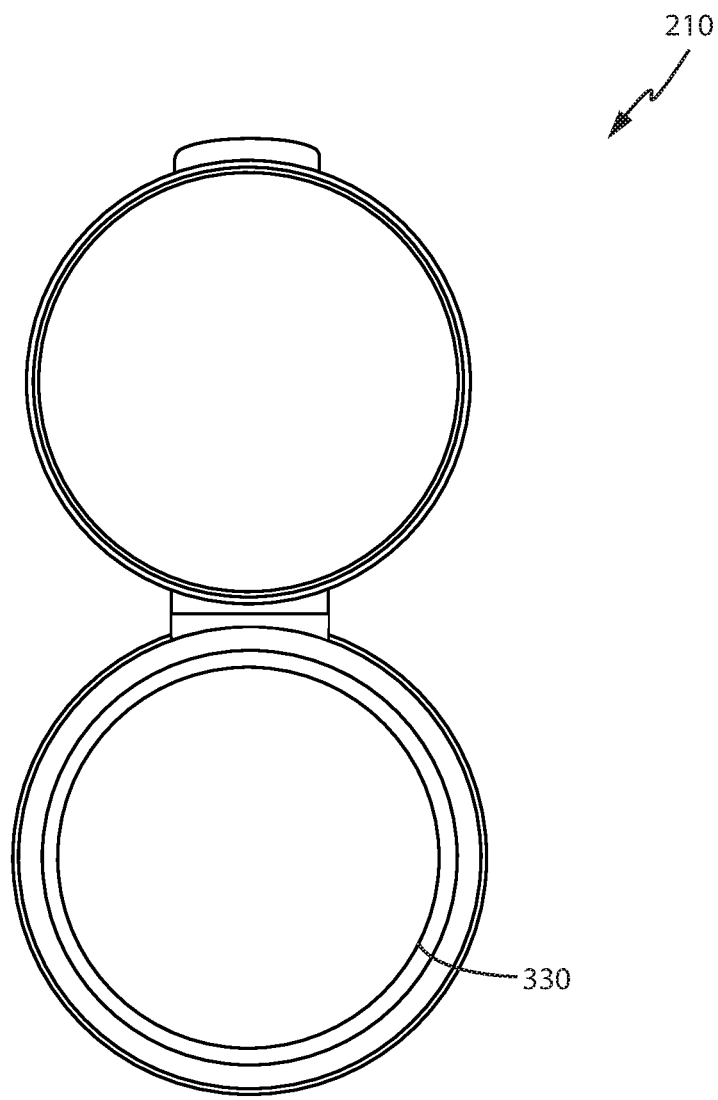
FIG. 28 is a top view thereof.

FIG. 28 is a top view of a round-bottomed container 210 with a living hinge with the lid in the open position. The inner concentric circle as described herein 330 is also shown.

FIG. 29 is a perspective view of a substantially rectangular-bottomed container 410 with a living hinge and a lid having an inner dual seal. The bottom edge of the lid 504 with lip 506 that fits within the inner indentation 508 that runs the entire inner circumference of the container and the outer rib 510 of the inner indentation. When the top of the lid 502 is pressed into the container, a dual seal is created.

FIG. 30 is a side view of a substantially rectangular-bottomed container 210 with a living hinge with the lid in the open position showing the lip 506 and the substantial bottom edge of the lid that friction fits into the container and the outside rib of the bottom portion of the dual seal 510 is shown.

Figure 31:
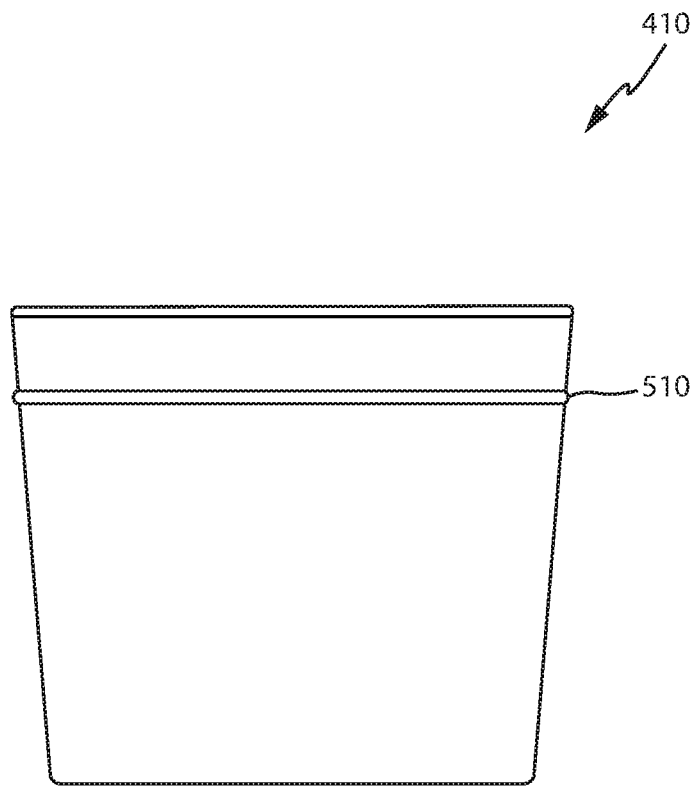
FIG. 31 is a front view thereof.

FIG. 31 is a front view of a substantially rectangular-bottomed container 210 with a living hinge with the lid in the open position and the outside rib of the bottom portion of the dual seal 510.

Figure 32:
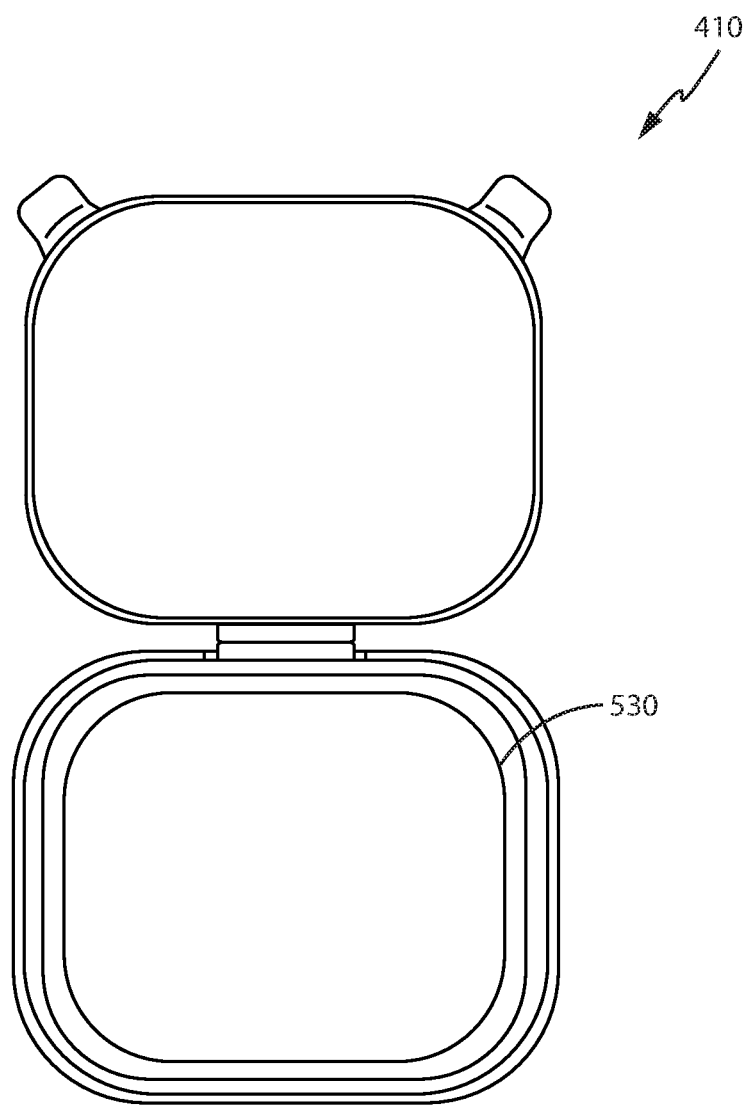
FIG. 32 is a top view thereof.

FIG. 32 is a top view of a substantially rectangular-bottomed container 410 with a living hinge and a lid having an inner dual seal with an indented lid with the lid in an open position. As shown, the inner concentric substantially rectangular shaped structure 530 appears just above the base of the container and follows the contour of the inside shape of the container. This portion of the container has a slightly smaller diameter that the rest of the inside of the container and is about 0.5 to 1.5 cm high from the base of the inside of the container. The structure aids in stacking the containers and provides ease of removal because the containers do not stick together.

FIG. 33 is a perspective view of the inventive cups 20 with a living hinge and an inner dual seal stacked with the lid in the open position. All cups and containers stack in this fashion. The dashed lines show the interior bottoms of each of the cups and where they sit as a result of the inner concentric circle 132 in the bottom portion of each cup.

Figure 34:
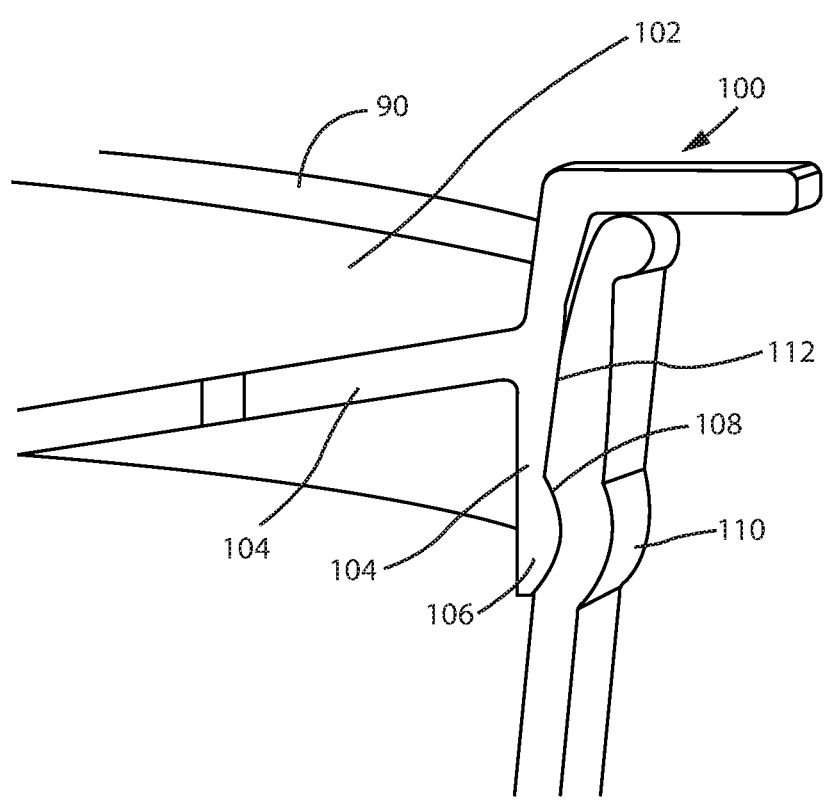
FIG. 34 is a side, blown-up view of the inner dual seal on the lid in a closed position.

FIG. 34 is a side, blown-up view of the inner dual seal created by a lip 106 on the bottom portion of the lid 104 meeting the indentation in the inner portion of the cup 108 plus the friction between the lid and the cup 112. Also shown is the top surface of the lid 104 shown with a fluid diverter that runs diagonally down from the seal toward the center of the lid 100 to direct fluid away from the seal. As shown, the lid is in a closed position. The indentation running the circumference of the inner portion of the cup 108 is shown along with the corresponding rib on the outside 110. Therefore, the dual seal structure is shown in detail comprised of 112 plus 104, 106, 108, and 110.

Figure 35:
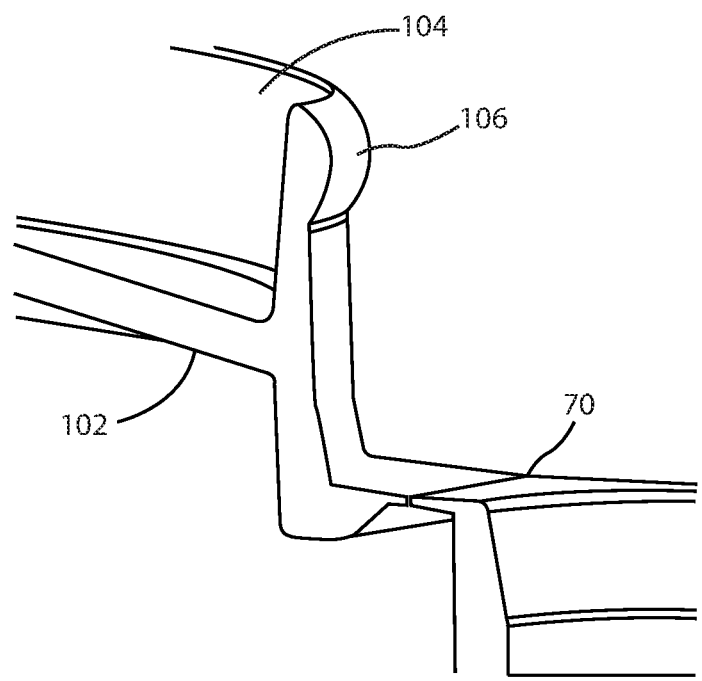
FIG. 35 is a perspective view of the inner dual seal on the lid in an open position.

FIG. 35 is a perspective view of the inner dual seal on the lid in an open position. The top surface of the lid 102 is shown along with the bottom portion 104 having a lip on the bottom edge of the lid 106 creating one aspect of the dual seal. This lip works in connection with the friction fit of the lid 100 within the lower receptacle portion of the cup (not shown) when the living hinge 70 is closed.

Figure 36:
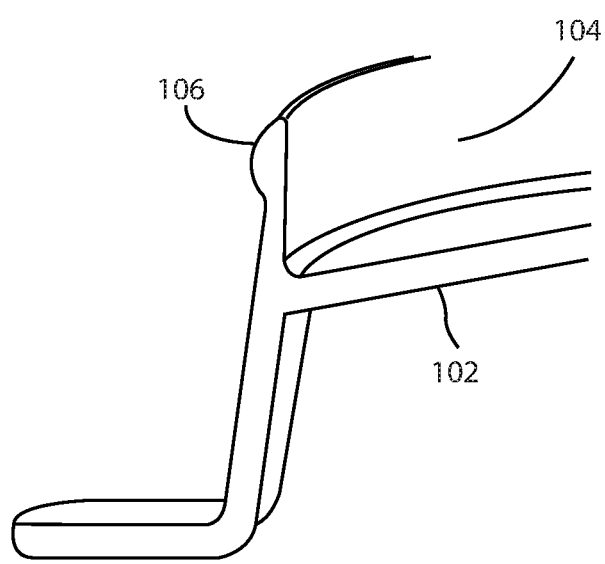
FIG. 36 is a second perspective view of the inner dual seal on the lid in an open position.

FIG. 36 is a second perspective view of the inner dual seal on the lid in an open position. The top surface of the lid 102 is shown along with the bottom portion 104 having a lip on the bottom edge of the lid 106 creating one aspect of the dual seal. This lip works in connection with the friction fit of the lid 100 within the lower receptacle portion of the cup (not shown).

Figure 37:
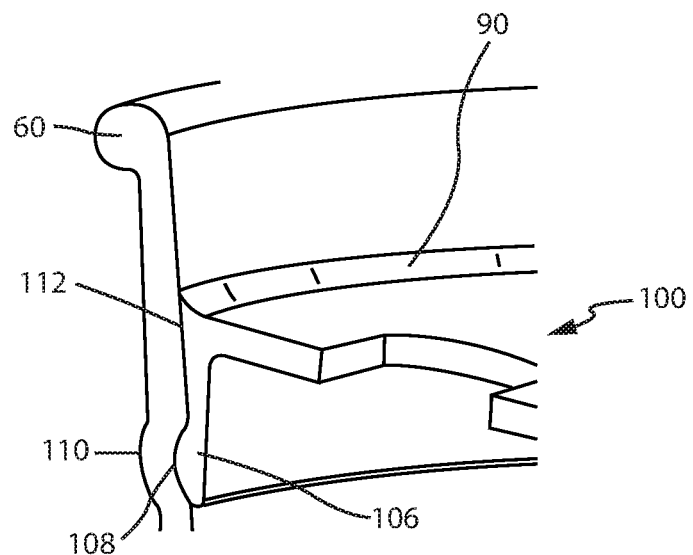
FIG. 37 is a blown-up perspective view of the inner dual seal on the lid in a closed position.

FIG. 37 is a blown-up perspective view of the inner dual seal on the lid in a closed position. One component of the dual seal is shown as the lip on the bottom edge of the lid 106 that fits into the indentation running the circumference of the inner portion of the cup 108, and the outer rib created by this indentation 110 is also shown. A second component of the dual seal is shown 112 by the friction fit of the lid 100 within the lower receptacle portion of the cup. The top edge of the cup 60 is shown to denote that it is a portion of the cup and the fluid diverter 90 is also shown in detail and its diagonal orientation from the seal toward the center of the cup is shown.

Figure 38:
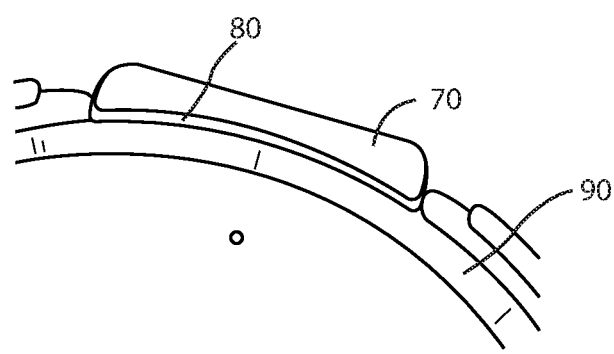
FIG. 38 is a blown-up perspective view of the living hinge.

FIG. 38 is a blown-up perspective view of the living hinge 70 and the flexible radius 80 that takes on the shape of the inside of the lid. The fluid diverter 90 is also shown as running the entire inside circumference of the lid and is consistent throughout, even where the living hinge is positioned.

Figure 39:
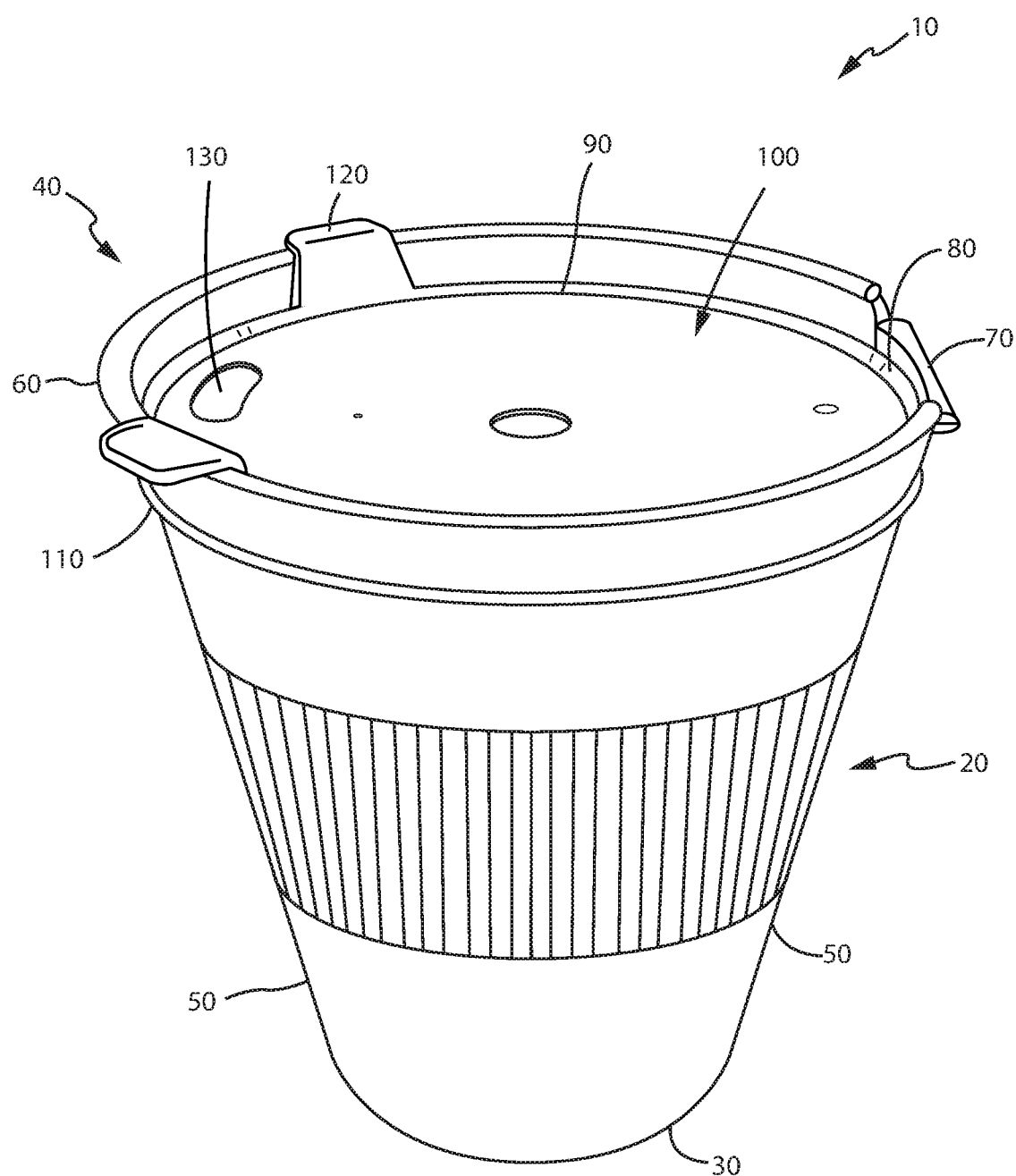
FIG. 39 is a perspective view of the cup with insulated ribbing wrapping the outside of the cup.

FIG. 39 is a perspective view of the cups of the present invention having external ribbing, which makes the cups self-insulating. The additional ribbing may be molded into the structure of the cup and serves to help keep liquids inside warm and protect a user's hand when carrying and drinking. Alternatively, the cups of the present invention may have a built-in sleeve that serves to make the cups self-insulating. Labels or other markings may be integrated into the sleeve and will be one cohesive material and product in accordance with the teachings of the instant application.

All of the foregoing include multiple bi-directional seals creating two or more sets of sealing features and the bi-directional sealing feature incorporated on the lid sealing on the outside as well as the interior.

While the present invention has been described with regards to particular embodiments, it is recognized that additional variations of the present invention may be devised without departing from the inventive concept.

INDUSTRIAL APPLICABILITY

This invention may be industrially applied in many different fields requiring disposable or reusable, sealable cups and containers, including food; aerospace; home goods; sports; medical settings for specimen collection, dosing medicine, and administering liquids; and educational industries and settings.

What is claimed is:

1. An injection molded, sealable cup made from molten polypropylene for holding liquid or food comprising
    (a) a lower, receptacle portion having a base, an open top, and side walls in between the base and the open top, the base having a smaller diameter than the top, the side walls forming a cylinder from the base to the open top and creating an inner and outer portion of the cup, the open top having an upper edge defining the outermost circumference of the open top and a living hinge with a flexible radius and an indentation that runs the full circumference of the inner portion of the cup below the upper edge;
    (b) the living hinge molded in the upper edge of the open top attached to the lower receptacle portion and a recessed lid, the living hinge allowing the lid to flex over the open top, the living hinge having a straight flex point, the living hinge having flat walls that extend from the straight flex point, and the flat walls extending from the straight flex point having a shape opposite the straight flex point that is contoured to the shape of the inner portion of the cup and the edge of the recessed lid so that when the living hinge is closed, the lid securably fits into the indentation that runs the full circumference of the inner portion of the cup;
    (c) the lid having a top surface and a bottom surface of a size and shape to securably fit into the inner circumference of the open top of the cup, the top surface of the lid being sloped downward from the outermost circumference of the open top to the center of the lid, the circumference around the bottom surface of the lid having a lip extending down from the circumference of the lid, the lip creating a dual seal structure having a rib on the bottom edge that fits in the indentation that runs the full circumference of the inner portion of the cup and a top edge that is the same size and shape as the inner circumference of the upper edge of the top that creates a friction fit seal between the lid and the inner bottom portion of the cup, the lid having one or more l-shaped tabs extending from the top edge up and over the upper edge of the cup;
    wherein the living hinge permits the lid to bend along a line of the hinge to flexibly secure the lid to the lower receptacle portion of the cup and prevent leakage of the material held therein;
    wherein when the living hinge is closed and the lid is flexibly secured to the lower receptable portion of the cup, the lid is fully recessed into the lower receptable portion of the cup;
    wherein when the living hinge is closed, the flat walls that extend from the straight flex point lie flat next to each other;
    wherein the indentation that runs the full circumference of the top surface of the lid positioned below the upper edge of the cup when the cup is in the closed position directs fluid away from the seal and into the center of the lid; and
    wherein the dual seal ensures that the outer circumference of the lid contacts the inner circumference of the lower receptacle portion of the cup via the rib fitting into the indentation and the edge of the lip contacting the inside of the cup to ensure a secure seal.

2. The molded, sealable cup of claim 1, wherein the cup is made of polypropylene.

3. The molded, sealable cup of claim 1, wherein the lid has a small opening opposite the living hinge and to allow liquid to pass through and a breathe hole adjacent to the living hinge to allow for the smooth flow of liquid.

4. The molded, sealable cup of claim 1, wherein the base of the inner portion of the cup has a concentrically molded ring extending the circumference of the inner portion of the cup on the sidewall just above the base wherein the concentrically molded ring allows cups to be stacked together and easily removed.

5. The molded, sealable cup of claim 1, wherein the upper edge of the cup has a break in the circumference to accommodate the living hinge, the break in the circumference having two arcuate edges on either side of the living hinge extending from the flexible radius of the living hinge up to the upper edge.

6. The molded, sealable cup of claim 1 having a label wrapped around the lower receptacle portion.

7. The molded, sealable cup of claim 1 having a built-in insulation sleeve comprised of vertical concentric ribs.

8. An injection molded, sealable cup made from molten polypropylene for holding liquid or food comprising
    (a) a lower, receptacle portion having a base, an open top, and side walls in between the base and the open top, the base having a smaller diameter than the top, the side walls forming a cylinder from the base to the open top and creating an inner and outer portion of the cup, the open top having an upper edge defining the outermost circumference of the open top and a living hinge;
    (b) the living hinge molded in the upper edge of the open top attached to the lower receptacle portion and a dome-shaped lid, the living hinge having a straight flex point, the living hinge having flat walls that extend from the straight flex point, and the flat walls extending from the straight flex point having a shape opposite the straight flex point that is contoured to the shape of the outside of the lower receptable portion and the outer edge of the dome-shaped lid allowing the dome-shaped lid to flex over the open top wherein the lid securably fits into the indentation that runs the full circumference of the inner portion of the cup;

(c) the dome-shaped lid having a top surface and a bottom edge of a size and shape to securably fit into the inner circumference of the open top of the cup, the top surface of the lid having a dome shape rising from the outermost circumference of the open top, the circumference around the bottom surface of the lid having a lip extending down from the bottom edge of the circumference of the lid, the lip creating a dual seal structure having a rib on the bottom edge that fits in the indentation that runs the full circumference of the inner portion of the cup and a top edge that is the same size and shape as the inner circumference of the upper edge of the top, the top edge having one or more tabs extending from the top edge up and over the upper edge of the cup;

wherein the living hinge permits the lid to bend along a line of the hinge to flexibly secure the lid to the lower receptacle portion and prevent leakage of the material held therein; and wherein when the living hinge is closed, the flat walls that extend from the straight flex point lie flat next to each other.

9. The molded, sealable cup of claim 8, wherein the cup is made of polypropylene.

10. The molded, sealable cup of claim 8, wherein the lid has a small opening opposite the living hinge to allow liquid to pass through and a breath hole adjacent to the living hinge to allow for the smooth flow of liquid.

11. The molded, sealable cup of claim 8, wherein the base of the inner portion of the cup has a concentrically molded ring extending the circumference of the inner portion of the cup on the sidewall just above the base wherein the concentrically molded ring allows cups to be stacked together and easily removed.

12. An injection molded, sealable container made from molten polypropylene for holding liquid or food comprising a lower, receptacle portion having a base, an open top, and side walls in between the base and the open top, the base having a smaller area than the top, the side walls extending from the base to the open top and creating an inner and outer portion of the container, the open top having an upper edge defining the outermost circumference of the open top and a living hinge with a flexible radius and an indentation that runs the full circumference of the inner portion of the container below the upper edge;

the living hinge molded in the upper edge of the open top attached to the lower receptacle portion and a recessed lid, the living hinge allowing the lid to flex over the open top, the living hinge having a straight flex point, the living hinge having flat walls that extend from the straight flex point, and the flat walls extending from the straight flex point having a shape opposite the straight flex point that is contoured to the shape of the inner portion of the container and the edge of the recessed lid so that when the living hinge is closed, the lid securably fits into the indentation that runs the full circumference of the inner portion of the container;

the lid having a top surface and a bottom surface of a size and shape to securably fit into the inner circumference of the open top of the container, the top surface of the lid being sloped downward from the outermost circumference of the open top to the center of the lid, the circumference around the bottom surface of the lid having a lip extending down from the circumference of the lid, the lip creating a dual seal structure having a rib on the bottom edge that fits in the indentation that runs the full circumference of the inner portion of the container and a top edge that is the same size and shape as the inner circumference of the upper edge of the top, the top edge having one or more l-shaped tabs extending from the top edge up and over the upper edge of the container;

wherein when the living hinge is closed and the lid is flexibly secured to the lower receptable portion of the container and the lid is fully recessed into the lower receptable portion of the container;

wherein when the living hinge is closed, the flat walls that extend from the straight flex point lie flat next to each other; and wherein the living hinge permits the lid to bend along a line of the hinge to flexibly secure the lid to the container and prevent leakage of the material held therein.

13. The container of claim 12, wherein the base is rectangular.

14. The container of claim 12, wherein the base is square.

15. The container of claim 12, wherein there is an opening in the lid.

16. The container of claim 12, wherein the container is made of polypropylene.

* * * * *